United States Patent
McLaren et al.

(10) Patent No.: US 9,613,330 B2
(45) Date of Patent: Apr. 4, 2017

(54) IDENTITY AND ACCESS MANAGEMENT

(71) Applicant: EMC Corporation, Hopkinton, MA (US)

(72) Inventors: Christopher Clifton McLaren, Cambridge (CA); Prashant R. Juvekar, Littleton, MA (US); Prashant Darisi, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/037,241

(22) Filed: Sep. 25, 2013

(65) Prior Publication Data

US 2015/0066572 A1    Mar. 5, 2015

Related U.S. Application Data

(60) Provisional application No. 61/705,843, filed on Sep. 26, 2012.

(51) Int. Cl.
*G06Q 10/06* (2012.01)
*G06F 9/54* (2006.01)
*H04L 29/06* (2006.01)

(52) U.S. Cl.
CPC ....... *G06Q 10/06316* (2013.01); *G06F 9/541* (2013.01); *H04L 63/10* (2013.01)

(58) Field of Classification Search
CPC .. G06F 9/541; G06F 21/62; G06F 2221/2141; H04L 63/10
See application file for complete search history.

(56) References Cited

U.S. PATENT DOCUMENTS

| | | | |
|---|---|---|---|
| 5,675,782 A * | 10/1997 | Montague | G06F 21/604 707/999.01 |
| 7,272,815 B1 * | 9/2007 | Eldridge et al. | 717/101 |
| 2002/0184535 A1 * | 12/2002 | Moaven et al. | 713/202 |
| 2005/0086531 A1 * | 4/2005 | Kenrich | 713/201 |
| 2006/0074703 A1 * | 4/2006 | Bhandarkar et al. | 705/1 |
| 2008/0270174 A1 * | 10/2008 | Schlesinger et al. | 705/1 |
| 2009/0144252 A1 * | 6/2009 | Koch | G06F 17/30439 |
| 2009/0210435 A1 * | 8/2009 | Akiyama et al. | 707/100 |
| 2010/0263025 A1 * | 10/2010 | Neitzel et al. | 726/4 |
| 2011/0066694 A1 * | 3/2011 | Barrett et al. | 709/207 |
| 2013/0109365 A1 * | 5/2013 | Buzdugan | H04W 76/002 455/416 |
| 2013/0179548 A1 * | 7/2013 | Singh et al. | 709/220 |

* cited by examiner

*Primary Examiner* — Nga B. Nguyen
*Assistant Examiner* — Alissa Karmis
(74) *Attorney, Agent, or Firm* — BainwoodHuang

(57) ABSTRACT

A computer-implemented process for an endpoint for automated fulfillment, includes: in an Automatic Fulfillment (AF) server: creating an endpoint on the AF server; selecting supported commands; and for each command, defining required and optional parameters and endpoint type specific implementation details; and in a Compliance Manager (CM): running discovery to find new endpoint and create metadata for it in the CM; for each command to be automated, filling in mappings for at least all required parameters; and enabling the command; enabling the endpoint; binding the endpoint to a business source; and ensuring that the business source uses a fulfillment process that uses the AF server.

19 Claims, 24 Drawing Sheets

IDENTITY AND ACCESS MANAGEMENT

BACKGROUND

The present invention relates to enterprise systems, and more particularly to identity and access management.

Organizations and businesses generally need visibility and control of who has access to which applications and data in their enterprise. These organizations and businesses need a reliable, an efficient, and a cost-effective way to automate key activities across an identity and access management lifecycle.

In general, organizations and businesses have two primary requirements. First, organizations and businesses need to ensure that each user's ability to connect to applications, perform activities within those applications, and access corporate data is appropriate to their job function and is compliant with policies. Second, organizations and businesses need a platform which provides policy-based automation, in order to reliably and efficiently execute identity management business processes.

Doing so is not easy. There are a number of challenges, and a number of different audiences whose requirements must be simultaneously met. In addition, enterprises have realized that they must shift access decision-making responsibility from information technology (IT) to the line-of-business, and that traditional vendor solutions have not adequately met their needs.

SUMMARY

A computer-implemented process for an endpoint for automated fulfillment, includes: in an Automatic Fulfillment (AF) server: creating an endpoint on the AF server; selecting supported commands; and for each command, defining required and optional parameters and endpoint type specific implementation details; and in a Compliance Manager (CM): running discovery to find new endpoint and create metadata for it in the CM; for each command to be automated, filling in mappings for at least all required parameters; and enabling the command; enabling the endpoint; binding the endpoint to a business source; and ensuring that the business source uses a fulfillment process that uses the AF server.

In the following description, reference is made to the accompanying drawings which form a part hereof, and in which are shown example implementations. It should understood that other implementations are possible, and that these example implementations are intended to be merely illustrative.

DESCRIPTION OF THE DRAWINGS

FIG. 8 is a screenshot depicting aspects of an embodiment.

FIG. 15 is a screenshot depicting aspects of an embodiment.

DETAILED DESCRIPTION

Figure 1:
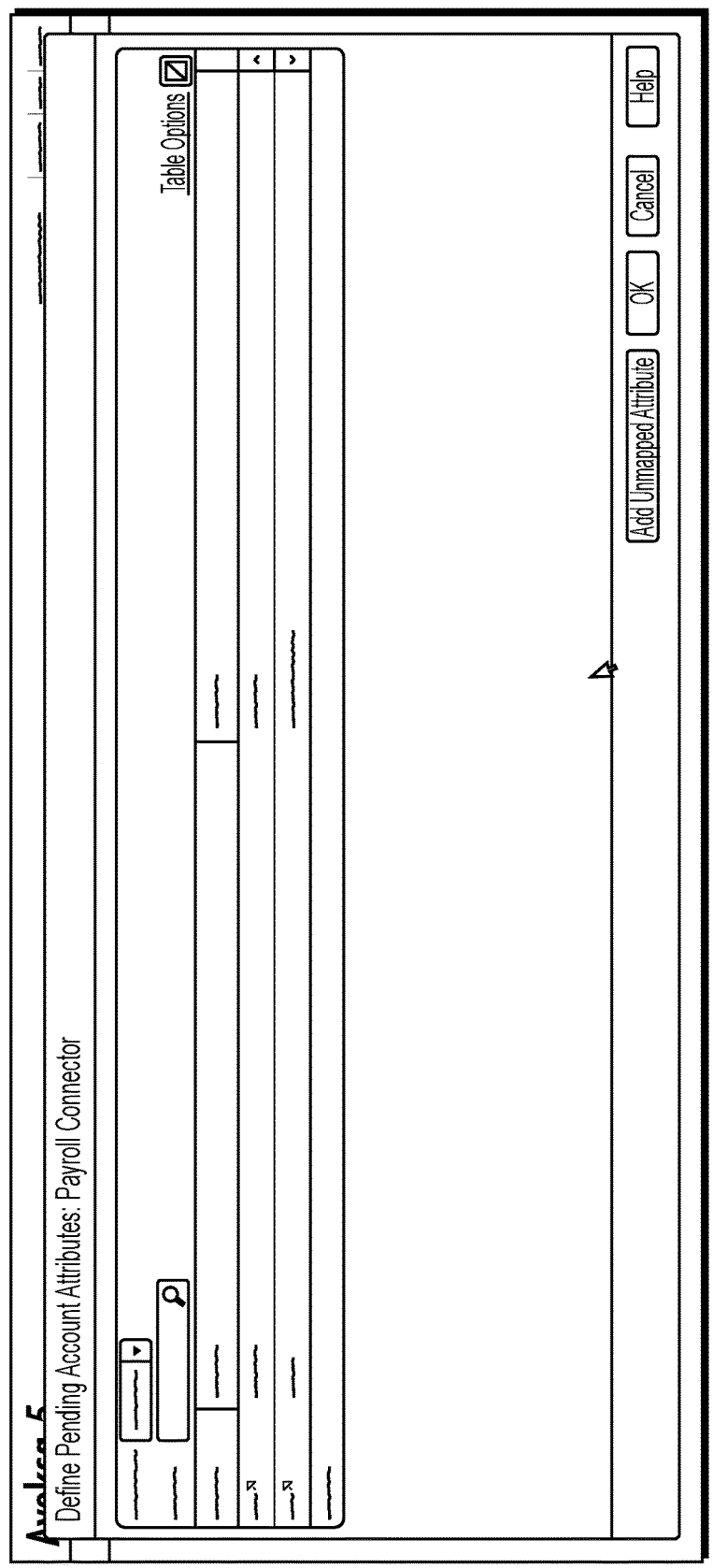
FIG. 1 is a screenshot depicting aspects of an embodiment.

Reference will now be made in detail to embodiments, examples of which are illustrated in the accompanying drawings. In the following detailed description, numerous specific details are set forth in order to provide a thorough understanding of the invention. However, it will be apparent to one skilled in the art that the invention may be practiced without these specific details. In other instances, well-known methods, procedures, components, circuits, and networks have not been described in detail so as not to unnecessarily obscure aspects of the embodiments.

A compliance manager, such as the Aveksa Compliance Manager (ACM™) from Aveksa of Waltham, Mass., provides enterprises with an ability to achieve visibility and compliance of entitlements, and define and apply policies to entitlements within their organization. Using ACM, organizations can easily automate access certification, compliance monitoring and reporting, and user entitlement remediation and change validation.

More specifically, the purpose of ACM is to provide a business-level view into governance data (e.g., who has what access, and why) and manage changes, at the business level, to that data. Many of these changes to the data are then turned into specific changes in application-level settings, permissions, entitlements across a broad number of systems. ACM primarily reads in data about users, entitlements, related objects (e.g., groups, roles, accounts) from governed systems and manages change to the relationship between these objects.

ACM does not manage the set of entities on a governed system, ACM just understands them, and can create change items that manage changes in the relationship between the objects. ACM might manage a change to give a user access to an entitlement, or remove a user from a group, but it doesn't create entitlements on the governed system, or create a group on the system. What this means to customers is that they can't create governance-driven processes to handle creation of these objects. Some other system must be used to create the entities, and then that system must be collected to get the objects into ACM. Additionally, it means that all the work sunk into product configuration to create approval and fulfillment processes, with the logic around who can approve what, and how fulfillments are escalated, and so forth, can't be used in the creation of objects on the governed systems.

Consequently, adding support for the ability to create some of these objects represents an advantage to the customers, i.e., enabling them to leverage all the existing configurations of business processes, and allowing these changes to be made in a governance-focused way.

In the present invention, the creation of objects in the governed systems is done in the context of creating what's required to fulfill governance objectives, not in the context of providing centralized management for the contents of all governed systems.

The present invention enables the ability to explicitly request creation of an account for a specific user in a specific business source, i.e., the ability to ask to add an entitlement to a user. The creation is done as an access request against an existing user. This can be created as a request button, using custom request button functionality.

For each business source that supports creating accounts, there may be one or more "account templates." These are business source-specific sets of default attribute value definitions for the accounts. For each attribute on an account object, the template may contain an expression that will function as the default value for that attribute in every newly created account. These expressions may be literal values, variables that are substituted with information from the attributes of the relevant user, requestor, or business source, or combination of multiple literals and variables.

Additionally, a template can define the form to use when creating accounts with this template.

Templates are not "owned" by the business source, and multiple sources can use common templates. In particular, the default template/form combination may be used by multiple sources.

Template bindings are edited from a business source detail user interface (UI). Business sources with at least one account template bound to them are considered "enabled" for account creation operations. Sources with no template bound cannot have account creation requests made against them. For example, as shown in FIG. 1, on a payroll system a customer might keep account names synchronized with the user id's that are stored in present invention's master enterprise user entries. In this case the application's account template is configured to use the value of the user's user id as the value of the account's "Name" attribute. If it's known that no accounts on this system are shared, then the default value for the "is_shared" attribute could also be set with a literal.

Or, in a Lightweight Directory Access Protocol (LDAP) directory, there might be a custom attribute on the account object called "DN," and assuming all users live in the same container, one might configure the DN's value to be the DN of a user in that container with a DN equal to the user's user id, and so forth.

The mappings here also have access to the form variables and workflow custom variables specifically mentioned above, to support cases where custom calculations, external lookups, and so forth, are required.

In some use cases, the value of one of these template attributes needs to be something that can't be expressed as a string literal, a variable substitution, or a combination of the two. The present invention provides two options to handle this.

First, the simplest and widest in scope is the fact that one of the sources for variable substitution is form data, in cases where the change request involves an access request form. Since the values of form variables can be collected explicitly from the user, can be created by many of the form controls, or can be set by custom code (from simple Javascript blocks through to full round-trip REST calls to any kind of implementation). If one of the parameters needs to be a value calculated by some complex routine, or looked up from an external system, or whatever, the easiest way to get implement a form that includes the value and use it as part of the request submission.

Second, in cases where that's not possible—such as cases where no form is involved, and so forth, it is possible to map these values to variables that are calculated as part of the workflow process itself, allowing the values to be generated by anything that can operate inside a workflow process. In particular, this includes things like SQL nodes looking up database values, and Java nodes running custom code to calculate values, and so forth.

In both of the cases described above, the solution isn't to make the mappings more complicated than combinations of string literals and variable substitutions—instead they add new sources of variables for substitution, using existing hooks.

To avoid requiring a custom request button for each business source that supports creating accounts, the new request button/action mentioned above uses account template metadata, allowing the one button to provide create capabilities to all sources supporting account creation.

When the request button is used to trigger account creation, this takes one to a business source picker that shows all sources that have at least one create account template configured against them. When a source is selected, the present invention either goes directly to the form associated with that template, or lets one pick which template (and thus form) to use.

Since forms use their own variables for each control (i.e. there is no concept of "bound controls") there needs to be a bridge between the attribute data for the account passed in from the template, and the contents of the controls on the page. This bridge is a non-visual form control called the form template control.

Handles setting the attribute values into the form controls initially, generating the change item to actually create the object—picking up edited values from the form controls—when the form is submitted.

Configuring the control amounts to associating controls on the form to attributes in the template. When the form is first rendered this control sets the values of the mapped controls to the attribute values passed in from the template.

When the form is submitted, any mapped attributes are updated with the current values of their controls, and then the change item to create the account is created, populated with the attributes from the template and any updates made on the form.

The end result of this processing is a change request to actually get the account created. This change request includes a change item representing the atomic unit of work to create the account. This change item is of a type—a "create account" type.

This change item carries the details of the business source and user for which the account is being created, as well as the attribute data. The change request also carries the submitted form data for display later.

All the existing user interfaces that display change item details support this change item type, and can render the details of it appropriately.

The existence of the change item type also implies the existence of a subprocess that can verify that the change item was completed—in this case a subprocess that runs as part of the collection to mark the "create account" item as verified if the account is found in the collected data.

Since it is likely that change requests that include items to create accounts may need to be approved differently than requests that don't, the decision node that is used to branch workflow paths is extended to support branching on requests that contain object creation changes. The usual filtering is in place here, allowing the conditions to be made more specific ("if the request contains an object creation, and the object being created is an account, and the account is in one of {Payroll, AD, SalesContacts} then . . . ").

Once the request reaches the fulfillment stage, assuming the fulfillment process uses manual fulfillment, the user the system selects to fulfill the account creation item is given a new activity. As part of fulfilling the activity they will be able to see the form used during the request process, so all information available from it will be available for use in manual fulfillment.

While the account is created in the governed system once the fulfillment is complete, it is not known to the present invention until that system next has accounts collected from it. The account will not show up under the user's access, nor will it be able to be used in entitlement requests, and so forth, until after the collection.

The present invention enables business users to request entitlements for a user without having to know anything about accounts. When such a request is made, the present invention determines whether the user already has a single account for that application and therefore which account to make changes to. If the user does not have an account in the application, the present invention needs to determine whether not to allow requests in this way if they don't already have an account (and re-direct them to an account creation process) or implicitly create an account for them as part of the entitlement request process.

The present intention can determine through a request whether a user has multiple account and thus query the user as to which account they intent to modify. The request process they are going through may be configured to only work against certain "types" of accounts like "business account" vs. "administrative account" and therefore the present invention is able to disambiguate it on its own. In addition to disambiguating accounts, the extended account awareness built into the change request submission process includes a higher level of knowledge about shared accounts, and provides more specific confirmation details and warning messages interactively when change requests involve changes to shared accounts.

For example, if a request is made to remove an entitlement from a user, and the present invention determines that the user has this entitlement due to a shared account, the confirmation screen makes this obvious to the requestor, and allows them to see the others users who will be affected by this change.

Any changes to shared account are highlighted on the confirmation screen, and the screen allows the requestor to drill-down into information about the set of changes to user-entitlements for all users that will result from these changes.

The present invention also handles a user assigned an entitlement in an application where he does not already have an account. For example, if Jim wants to give John the "Salary Adjustment" entitlement in the Payroll application, fulfilling this request actually requires John to have an account in the Payroll application. In order to handle this type of case, the present invention needs to be able to determine when a request requires the creation of an account, and then determine if it should try to create the account (and how), or if it should refuse the request.

To implement this, every business source has an implicit account creation policy, which describes how the present invention should handle cases where account creation is required. Possible policy options include the following:

The system should automatically create accounts when they are implicitly required by change requests, and all required information is pre-configured The system should automatically create accounts when they are implicitly required by change requests, and a template is specified for collecting information interactively The system should automatically create accounts when they are implicitly required by change requests, and any bound template can be used for collecting information interactively The system can't implicitly create accounts as part of other requests, but will instead direct you to start a new request with a particular form The system can't implicitly create accounts and refuses the request with a configurable message During the creation of change requests the now account-aware change request generation system determines if implicit account creation is required. This is equivalent to determining if entitlements are being assigned to a user on a system where he has no account. If so, the present invention looks up the policy for the relevant business source.

It is notable that this happens at the time the request is being made, i.e., while the user making the request is still sitting at a machine and can be interacted with—because some of the policy options will require interaction with the user to gather additional information.

With a policy involving a template without form, an account template is selected, and when implicit account creation is determined to be necessary, the system will automatically and non-interactively generate a create account change item and add it to the request, using the default attribute values from the template.

With a policy involving a known template, a particular template is selected for use when implicit account creation is determined to be necessary. At submit time the system will bring up the form associated with the template, populated with all the defaults from the template, just as If the user had explicitly requested account creation using this template. The generated "create account" change item(s) are added to the change request.

With policy involving bound templates, the list of available bound templates is displayed for the user to select from when implicit account creation is determined to be necessary. At submit time the system will bring up list, and then the form associated with the selected template, populated with all the defaults from the template, just as If the user had explicitly requested account creation using this template. The generated "create account" change item(s) are added to the change request.

With a policy requiring a new change request, the system determines when an account is required that isn't present, but doesn't implicitly add the create change item for that account to the request being submitted. Instead it refuses to submit the request, and provides a link to use to create a new change request specifically to create the account. The link is actually a link to the bound template for the application, or to the list of bound templates from which one must be selected. Using the link is equivalent to making a new explicit account creation request.

Normally this sort of policy would be used when different request business logic is required for the account creation than for the entitlement changes that require the account, meaning that the create account change item can't just be added into the request, but instead needs to be run in the context of an explicit creation request.

With a denied policy, the system refuses to allow submission of change requests that involve changes to user entitlement on systems where the user does not have a known account.

With all this functionality in place, the system can now automatically add explicit create account change items to requests that need them, with all the consequent governance benefits. The template solution allows administrators to greatly simplify the process of getting account creation right. The implicit policy solution for accounts allows us to track explicit account creation, with all attendant benefits, and coupled with the template solution allows account creation to be much more accurate when manually fulfilled, since the details of account attributes can be specified along with the creation request.

However, nothing in the solution so far deals with the inherent ordering issue. Assume a change request is created to add Entitlement E to User U, and the system determines that in order to have Entitlement E the user must first have an account in Application A. The system will add a generated "create account" change item to the request, garnering all the benefits mentioned above. BUT, the change request now contains two change items: the "create account" and the "add entitlement to account" items, and the second one cannot be fulfilled until after the first one.

This is a minor issue when dealing with purely manual fulfillment—even if the items are assigned to different users, the person assigned the "add entitlement to account" item can always resolve it the way that they would have before the create account items were added, and the person fulfilling the create can simply note that it was done. This does lose some of the benefits of the template/attribute specification, of course.

Ordering will become critically important for automatic fulfillment though, and so this "minor issue" should be addressed.

In ACM, the way the product learns about objects in governed systems is typically via collection. So creating an account as part of a change would, without other changes, result in an account being created on the endpoint system, but ACM would not have knowledge of that account until the next collection.

This presents a problem for efficient use of the account. Using the example of Jim giving John a Payroll entitlement, the system could decide that it needed to create a Payroll Account for John before It could assign the entitlement to that account. It could then add a "create account" type change item to the request. But it couldn't add an "add entitlement to account" item, because the account this item needs to reference doesn't yet exist. A solution where trying to give John this entitlement automatically creates an account, but doesn't let Jim actually assign the entitlement to that account until after the next account collection is untenable.

To solve this ACM introduces the notion of a "pending" account. When the system decides it needs to create an account, it adds the account to the internal ACM datastore, flagged in a "pending" state. This allows us to go ahead and create the "add entitlement to account" change item, having it refer to this account entry, even before we've created it.

With the pending account notion in place, we can handle our example request, with the system creating the pending account, and creating a change request containing two change items: a "create account" change item to actually get John's Payroll account in place on the endpoint, and an "add entitlement to account" item that requests the specified entitlement be added to the account.

Note that this change also requires significant changes to the code that interacts with sets of accounts, or displays accounts, across the entire system, as the pending accounts need to be clearly marked as such, and excluded from some calculations.

The basic component of the present invention is the introduction of a "pending" state for object existence in ACM's data stores. This allows the system to immediately create entries for objects whose creation has been requested, without needing the object creation to have been done, or a collection to occur. These entries are flagged as being in the "pending" state, which lets us know they haven't yet been reported as created, or collected.

For accounts, this means that generation of a "create account" change item can immediately create an entry in ACM's database for the account, flagged as pending. This gives us an account object to refer to in related change items (such as an "add entitlement to account").

The existence of the pending entry also removes any problems around the account-aware change request generation code being run from multiple different change requests while an account creation is in the process of being fulfilled. A second, or subsequent change request involving assigning entitlements to a user who has no account on the relevant system would find the pending account, and use it, instead of attempting to create the account for a second time.

The pending account will have attribute values for all those account attributes defined in the template, or created on the form. This allows the create account change item to contain a list of desired attribute values. It also allows any other processing that depends on the account attributes to proceed without needing the account to be collected.

When the next account collection is run these attribute values will be updated with the "real" data from the governed system, but in the interim using the expressions to populate the attributes allows us to handle all dependent processing that require information from the account which can be reliable predicted before the account is actually created.

The ability to define expressions for the account attributes in the templates solves all the issues for dependent operations in the cases where it's possible to predict what the account attributes will be.

However there are cases where this is not predictable, at least not predictable from the information that's available in ACM.

Examples include: account name that use a collision algorithm (i.e. I think "Robert Taylor" will have an account name of "rtaylor", but because Roger Taylor is already "rtaylor", Robert is going to get an account name of "rtaylor2"), accounts that have an "account number" that's assigned when the account is created based on something in the endpoint system, accounts in directories where the location that the account will be created isn't known up front, and so forth.

If the system creates a pending account for "Robert Taylor" who has a userid of "rtaylor", and the system is configured to set the Name attribute of pending accounts on this system to the user's userid, then a pending account created for Robert will think the account name is "rtaylor". Account creation succeeds, but the account that was created actually got a Name of "rtaylor2". ACM won't know that until the next collection, though.

Now ACM sends out a dependent "add entitlement to account" change, which specifies that the "Payroll:Alter" entitlement is to be added to account "rtaylor". This will also succeed, but it's Roger who gets the entitlement—unless the person doing the fulfillment is very alert (and in automated scenarios, even that "unless" goes away). The system won't know that until the next collection either.

Obviously this is unacceptable. The solution here is that we need to update the attributes of the pending account after the account is created, but without waiting until the next collection.

Since we already have something indicating when the account is created—a person indicating they have performed the action of creating the account—we can piggyback on that to force the reporting of the activity being complete to also return these problematic attribute values.

For manual fulfillment, this means that the "perform activity" screen for account creation needs to collect values for some configured set of attributes from the performer. Here the screen shows all the attributes that have template attribute definitions, with the calculated value (which might be empty) pre-filled as the defaults. The person doing the perform can alter/fill-in these values when account creation succeeds, and when the change item for account creation is updated to mark success the values provided can be used to update the pending account entry.

After the success message is received, the pending account attributes are updated to correct values, and the system can continue to the dependent processing, confident that the account attributes being used are "real" with respect to the endpoint.

While the other "createable" objects don't have the problem of implicit creation as accounts do, there are good reasons for also adopting the pending object model for groups and users as well.

For example, suppose a single change request is creating a group and assigning 10 members to it. We don't want to have to wait for a collection to confirm the creation has succeeded in order to get the group into the ACM database, and allow us to create the "add account to group" events. Instead, the generation of the "create group" change item can also create a pending group entry in the ACM DB, and all 10 "add account to group" events can then immediately be created, referring the this pending group entry.

The logic of pending entry creation, the use of templates and possibly forms to populate the initial attributes of the pending entry, the ability for the perform action to include specification of the "real" value of certain attribute post-creation which are used to update the entry, and the requirements for updating the UI and manipulation of sets of objects to understand the pending flag are all the same for groups as for accounts.

Even users, which don't need a collection, still benefit from this model, since the pending entry being created at request time allows other change items which refer to the user to be created immediately, even though the creation of the user hasn't passed approvals yet. All the same logic applies here as well, except that there is no need to deal with the "unpredictable attributes" problem in user creation, since the system will always use the specified attributes.

The existence of the pending account does allow items that refer to the account to be created before the account is collected, but that doesn't handle the ordering problem—if the fulfiller tries to fulfill the "add entitlement to account" change item before the account exists, there may be a problem.

Now that ACM supports operations that create objects in the governed systems, we need to also support a notion of dependent events—i.e. change items that can't be fulfilled until some dependent condition is accomplished. In this case the "add entitlement to account" event is dependent on the account having been created in the endpoint.

To implement this dependent event system, we need to make some changes to the fulfillment process. A "traffic management" fulfillment handler needs to look at the set of change items in the request, determine which ones it can handle now, and which are dependent on things that haven't happened yet. It can attempt to fulfill the ones that are "ready", and hold the others until it is signaled.

In our example case above the fulfillment would work like this:

1) The job enters fulfillment, with the two change items. The "create account" item is ready—it has no dependencies, but the "add entitlement to account" item is not ready as it needs the account to exist.
2) The system puts the "create account" item out for fulfillment. (This could mean giving someone a manual activity). The other item is not fulfilled. The system moves to a wait state.
3) At some point later ACM finds out that the create account succeeded or failed. This will typically happen because of an explicit signal (i.e. a manual activity to create the account was marked as having been performed) but could also happen as a result of a collection that finds the account. ACM updates the state of the pending account in the database to indicate it was created (on a success). This functions as a notification which causes the system to look at the waiting items again.
4) The system now determines that the "add entitlement to account" item is ready to be fulfilled, as its dependencies have been met. (Note that we probably haven't collected the account yet, and are trusting the manual notification—this is a configurable option, but is the efficient choice in most cases). This item is now sent to be fulfilled.
5) From that point forward the request continues to be handled as normal, until completion.

Note that this implies a much more complicated Fulfillment process—systems that support create operations will need to use fulfillment processes that can handle this "do what's ready" model.

Figure 2:
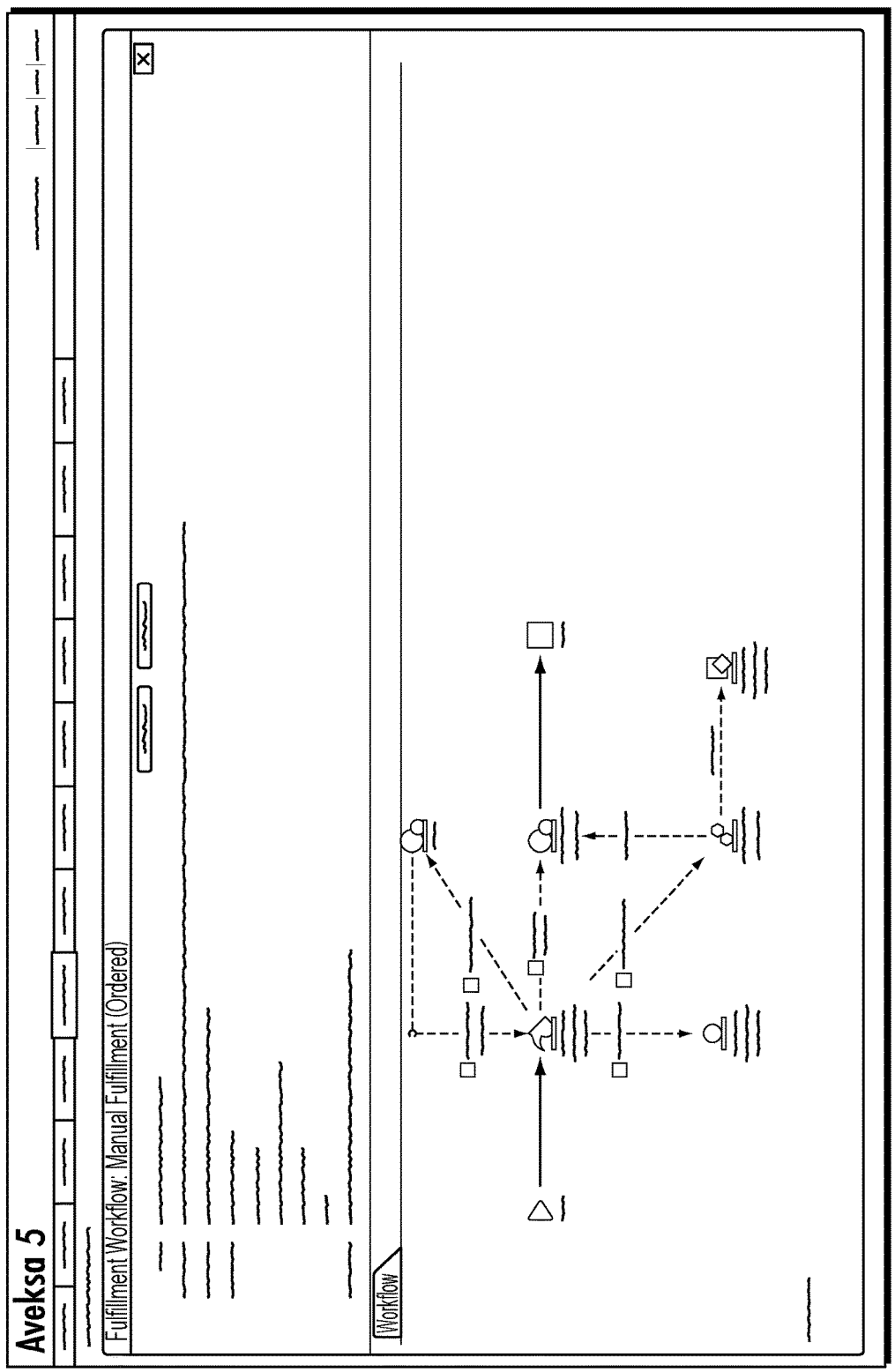
FIG. 2 is a screenshot depicting aspects of an embodiment.

As shown in FIG. 2, the out of the box process for systems that include create operations using manual fulfillment is illustrated.

One can see that the request is sent to the "Ordered Fulfillment Handler", which determines which items can be fulfilled, and send them to manual fulfillment. If there are unhandled items they go into the Wait state until a notification is received that sends the job back to the Ordered Fulfillment Handler, which may send additional items that are now "ready" to the manual fulfillment. This continues until all items are handled and the system ends up in a wait for verification state until collection confirms all the changes.

The Ordered Fulfillment Handler, which plays the role of the "traffic manager", decides which items have met their prerequisites (or didn't have any) and sending those for fulfillment. The handler is smart enough to understand the state of the individual items, so on each iteration it will only deal with items that are as yet unhandled.

The Wait node represents the job waiting until notification of some dependent condition being completed is met. Notifications can come in from multiple sources, specifically including users reporting the completion of activities, and collections verifying object creations. Note that the dependencies being discussed are not dependencies on other change items completing, but are dependencies on the existence of prerequisite objects.

In the sample scenario discussed above, the "add entitlement to account" change item is dependent on the account existing, not on the create account change item succeeded. (Although if the create change item succeeds, that will cause the account to exist).

This is particularly important because the code that calculates dependencies during change request generation works by detecting if any of the object involved in the change item are in the pending state, and if so marking the item as depending on that object. When the object's state changes from pending to "created" (someone said they created it) or "collected"/"verified" that clears the condition.

Note also that after an object has been reported as "created" subsequently created change items that reference the object are no longer dependent, and can be fulfilled immediately, even though no collection has yet occurred.

Change items can be dependent on more than one object's existence. The sample case here would be creation of a new group with some membership assigned. This would create a "create group" change item, and an "add account to group" item for each member assigned to the group. These "add account to group" items would depend on the creation of the group of course. If one is adding a user to the group who doesn't have an account on the directory the group is in, though, then the system may also be adding implicit account creation changes to the request as well, and then the "add account to group" item would be dependent on both the group existing, and the user's account having been created, before It could be fulfilled.

Sometimes one cannot create an account in a particular system unless an account already exists in another system. For example, a user may require a Windows NT® domain account before he can get an Exchange account.

The event dependency routine described above can handle these cases, as long as the metadata about the account dependencies is in the system.

The present invention extends the business source metadata to include the ability to specify a list of business sources in which an account has to exist before one can be created for this source.

This allows the system to determine if additional implicit account creations need to occur when doing the account analysis curing change request creation, and allows the account creations to have their dependencies set correctly.

Assume Application B requires an account to exist in Application A before one can be created in it. Both applications have implicit account creation policies allowing account creation, and specifying a form to use. If a change request is created assigning an entitlement from Application B to a user who has no accounts in either A or B, then when the request is submitted, the system will realize it needs to create two accounts, and will present the user with the two forms to gather the required information.

The change request will be created with three change items:
A create account change item for the user in Application A (no dependencies)
A create account change item for the user in Application B (dependent on the account existing in Application A)
An add entitlement to account change item for the account in application B and the specified entitlement (dependent on the account existing in Application B)

When this request gets to fulfillment, only the create account item for Application A can be fulfilled. When fulfillment of that succeeds then the create account item for Application B will be sent for fulfillment. When that succeeds then the add entitlement item will be sent to fulfillment.

As mentioned above, at a basic level, the purpose of the change management is to provide a business-level view into governance data (who has what access, and why) and manage changes, again at the business level, to that data.

An automatic fulfillment subsystem of the present invention is about making that "manage changes" aspect, and in particular the management of getting the changes fulfilled in the various systems that change management provides governance over, both faster and more accurate.

While change management can update the governance data as soon as something is approved, it's the "pushing" of the changes out to the endpoint systems that typically makes a change in access "real," in the sense that the alteration in access is actually reflected in what users can do, rather than in what they are approved to do.

This "push" to the real world is typically dependent on the users assigned the activities actually completing those activities. There are several potential causes of delay.
the users in question may not be aware they have activities to do if they typically don't check manually and some sort of notification hasn't been configured
the users may be overloaded with a backed-up queue of activities to do, or other duties that prevent them from making the fulfillment of the changes a priority
the users may be out of the office on vacation, or may even have been terminated
the data the system users to determine which user needs to make certain kinds of changes may be wrong or out of date
and so forth.

Additionally, when the relevant user knows there are activities to complete, and is actively working on them, there's always the possibility that mistakes will be made in fulfilling them. This is especially likely in cases where systems support multiple similar items (i.e. did one just give that user the privilege "JR-001-123-WA" or "JR-001-122-WA"?) or where the activities are requests for business-level changes that have to be translated by the user into application-specific changes manually (i.e. a request asks to add the "approve purchase orders" entitlement to a particular user's account in a particular system, and in order to fulfill this the person making the change has to set four flags on the user's account and create some kind of "PO limit" policy item in that particular system—it's pretty easy to imagine the fulfiller accidentally skipping a step, or setting a flag on the account that's actually not required, and so forth.)

So, for cases where the business-level entitlements that we expose to governance in change management map on to capabilities of accounts in real world computer systems, it would be a good thing if we could make the process of fulfilling requested changes as automatic as possible.

Automating this part of the process potentially results in a faster "push" of the changes out to the governed systems, which turn means real world productivity gains. Every hour spent waiting for access to the system one require to do oner job is lost value for the company, so getting that access faster represents a win in real dollars.

Similarly, when automation is correctly set up, the probability of error in the fulfillment step is vastly reduced, especially in the sorts of problematic cases mentioned above. Essentially one move from needing to get the translation of a request to a series of operations on the particular system being governed right every time there is a request to needing to get it right once when setting up the automation.

Note that this discussion is all about automation of the fulfillment step. The requests still have to process through all the normal business logic that is required before changes move to fulfillment, typically including one or more approvals, and so forth.

Note also that there are already some limited version of automated fulfillment available with the product through fulfillment handler integration with specific provisioning systems like ITIM, Sun, and certain SPML systems. All of these depend on the customer already having a provisioning solution in place, depend on a custom fulfillment handler specific to that provisioning system (except SPML which has its own issues), and all of which support a limited subset of the kinds of fulfillment compliance management needs.

The present invention supports a governance-focused approach to getting these change automatically fulfilled, which isn't tied to any particular provisioning solution, that is extensible and customizable, that supports a broad variety of endpoint systems, and that can grow in both breadth and depth as demanded.

1) While there is a significant amount of complex configuration required to setup automatic fulfillment, and many moving parts involved, the changes visible to compliance management user making a request are limited to two things:

The request will probably be fulfilled much faster, and with greater accuracy

Figure 3:
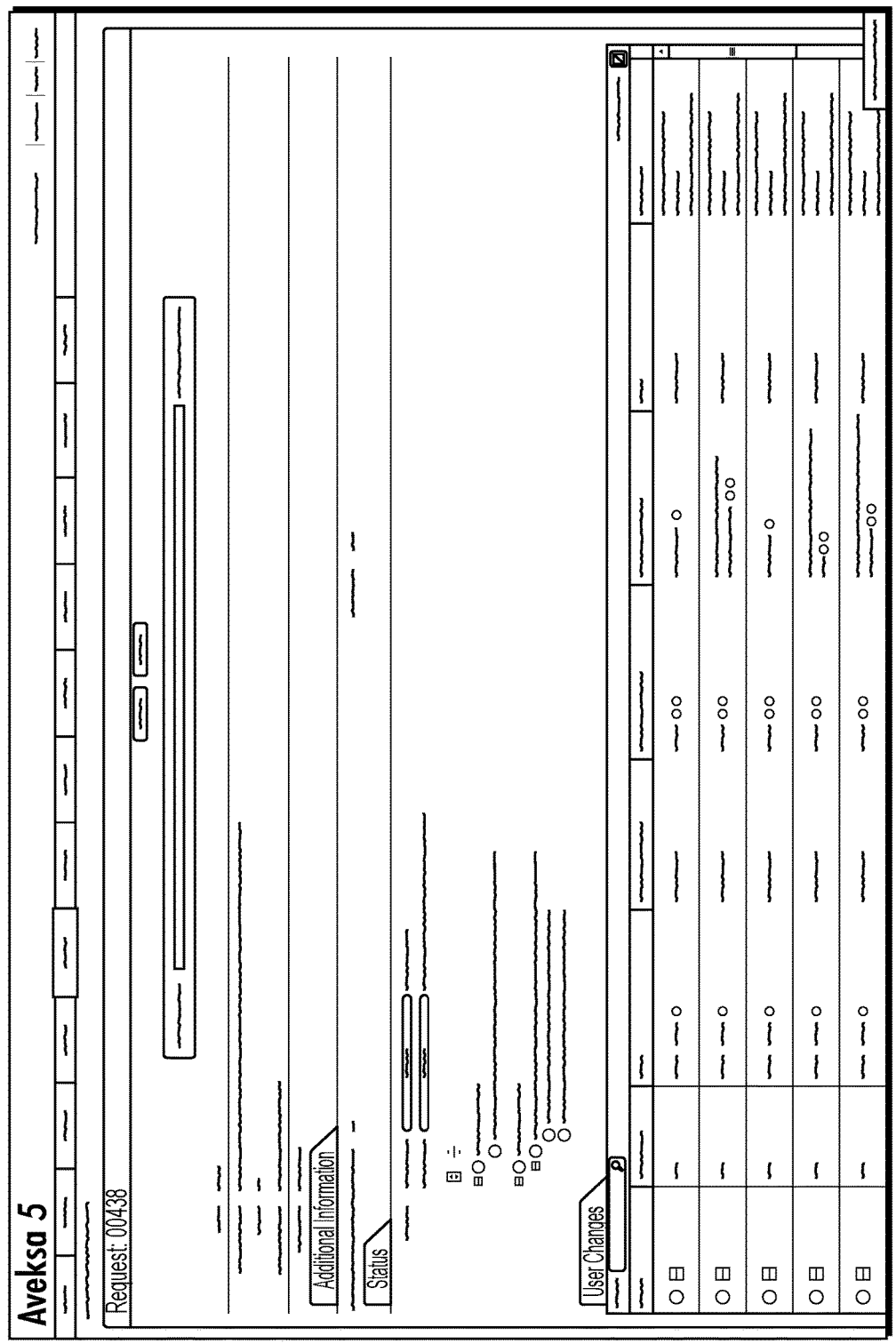
FIG. 3 is a screenshot depicting aspects of an embodiment.

2) The details visible on the request screen will show that the some or all of the changes in the request were handled automatically, and the comments for the change items that were so handled will show some more information about their automatic processing For the second point, as shown in FIG. 3, the request detail screen is illustrated. The core of the present invention from compliance management's view is the presence of a metadata driven fulfillment handler for automatic fulfillment. In this solution all processing up to the point of the fulfillment process happens just as it always has, but the fulfillment step gets things done by sending commands to a server that knows how to implement these commands on the governed endpoints. This server plays the role of a single point of communication for manipulating an arbitrary number of endpoints. The server is called the Automatic Fulfillment Express server, or "AFX Server".

In essence compliance management decides what all the atomic operations are, just as it always has, but now knows which of those atomic commands can be fulfilled automatically by the AFX Server, and fulfills them by communicating with the server.

This fulfillment handler knows how to create these commands, which are supported on which endpoints, and which endpoints exist, due to metadata in the compliance management's system that conies from a combination of discovery from the fulfillment server and configuration by a compliance management administrator.

Figure 4:
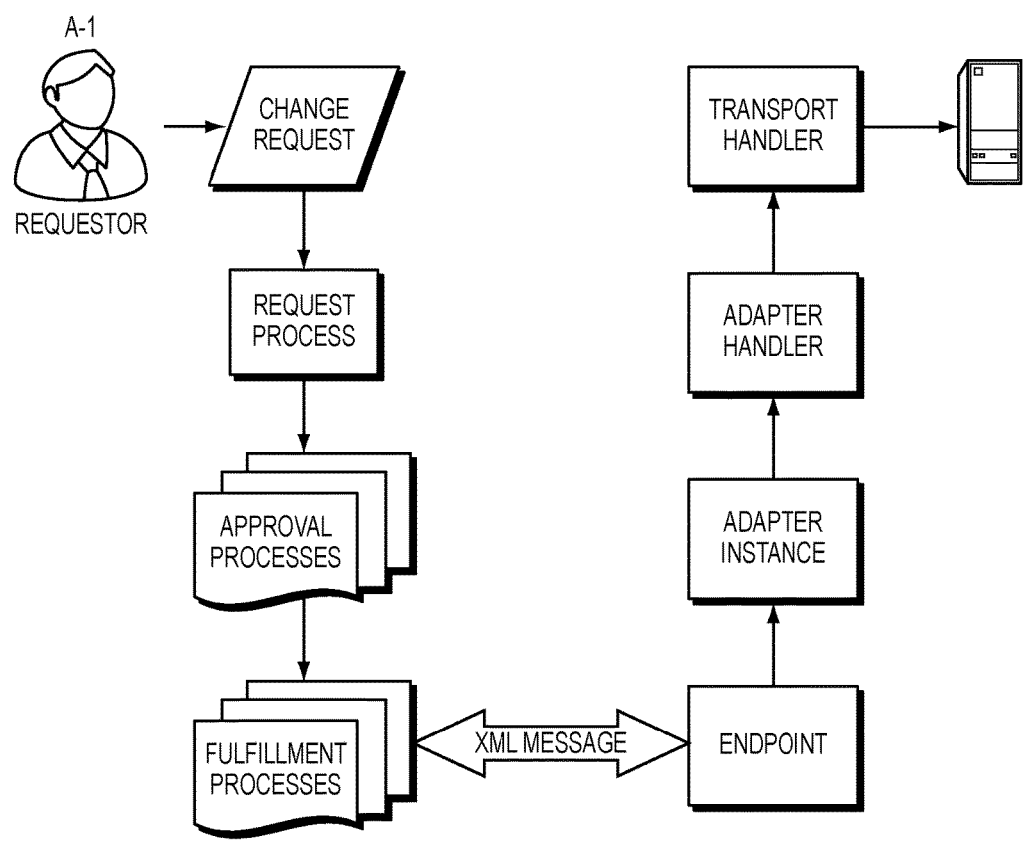
FIG. 4 is a process flow diagram depicting aspects of an embodiment.

As shown in FIG. 4, a high level the solution is illustrated. Here one can see that the process is as normal in ACM (the left hand side) until the fulfillment step is reached, at which point XML messages are used to convey the commands to actually fulfill the request are sent to the AFX Server (the right hand side—the system that will handle automatic fulfillments) where they are processed and eventually pushed to the endpoint system.

Figure 5:
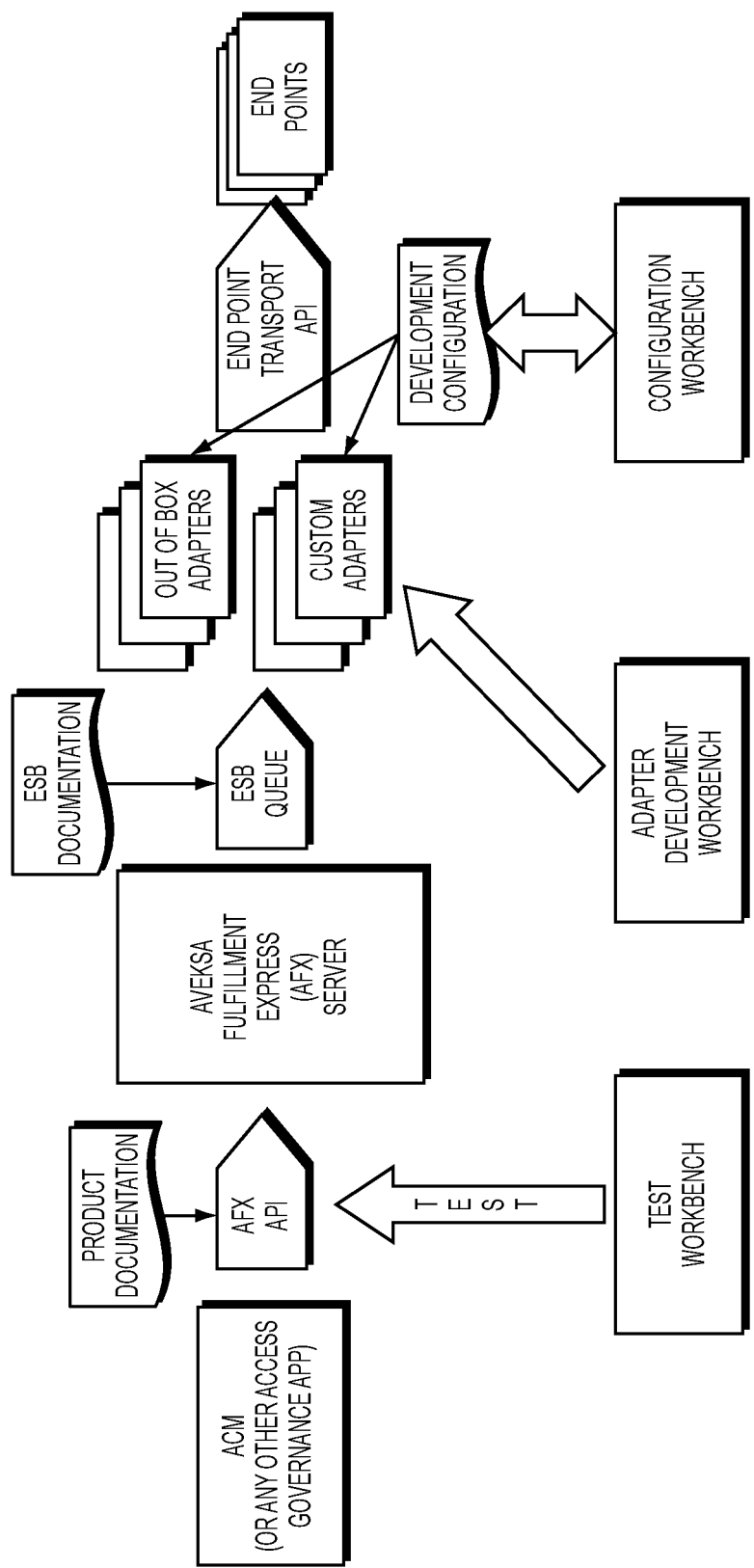
FIG. 5 is an exemplary high level architecture diagram showing aspects of an embodiment.

As shown in FIG. 5, an exemplary high level architecture diagram illustrates how communications flow from ACM to the AFX server, through to application specific adapters, and out to the endpoints themselves.

The core AFX server is built atop an open-source ESB solution (Mule), and contains control applications to manage the server itself and all the various connectors/adapters that handle communication with the endpoint systems. Additionally, the server has a configuration component that is used to define the endpoints and the contracts for communicating with them called the AFX Workbench.

The connectors are complex wrappers around the more basic connectors that work and take the raw functionality around communicating with the endpoints and associate them with rich metadata around how commands from ACM should be translated into native operations.

The wrappers also provide significant enterprise functionality including queuing, scheduling, operation batching, transactioning, and so forth.

The first requirement for automating changes on endpoint systems (those "real world" systems that ACM governs) is a "common language"—that is requests that come from ACM to make changes to the entitlements of users as ACM understand them need to be translated into requests for a kind of change that the endpoint will understand, and these changes need to be made to an object the endpoint will understand.

The "talk about users in a way the endpoint will understand" part is relatively simple. ACM already includes an abstraction called an "account" which represents essentially an identity on a particular system. In the preferred ACM model, as discussed above, users have access to accounts, and accounts actually hold the entitlements, rather than the users holding them directly.

As noted above, it is possible to have cases where users will hold entitlements directly, rather than via participation in an account, but those entitlements modeled that way won't be available for automated fulfillment, since the we don't have a way to explain "who" to the endpoint.

Since ACM has already been extended to disambiguate cases where users have multiple accounts on a system, each atomic change item that involves users will have a specific account explicitly associated with it.

Once ACM has determined which accounts to make changes to, there is still the matter of what kinds of changes to make. Here again a common language is needed—a way of describing the kinds of changes that can be made. In this case, we already have a simple grammar of verbs in the set of kinds of change items ACM supports. Since ACM already breaks change requests down into a collection of atomic change items of different types, we can use the set of change item types as the master list of possible commands that can be automatically fulfilled. I.e. an "Add Entitlement To Account" change item maps on to an "Add Entitlement To Account" command that can be sent out for automatic fulfillment, and a "Remove Account From Group" change item maps on to a "Remove Account From Group" command that can be sent out for automatic fulfillment.

ACM already understands this common language then, as it understands the users have access to accounts in business sources, and the set of commands we're using are the set of change item types ACM already understands. The endpoint systems that these applications represent also understand the accounts (that's where ACM gets them from). The endpoint system however, doesn't understand the commands that ACM understands, and even if they did, ACM doesn't know "where" the endpoint systems are or how to connect to them.

The AFX server plays a number of roles, but in a very real sense its primary role is to function as the gateway for taking these fulfillment commands from ACM and implementing them on the endpoint systems, i.e. ACM decides what to do, and tells the AFX server, and it in turn decides how to take these changes in the "common language" and turn them into endpoint specific changes, which it then performs.

In order to do this he AFX server also needs configuration and metadata. It needs to know what endpoints it talks to, how to connect to the endpoints, how to "talk" to the endpoints to implement the changes that ACM has requested, and so forth.

For each different type of back-end system the answers to these things may be different—not just different in detail, but different even in what kind of operation may be required. For example, two different endpoints might both be databases, that are connected to with JDBC, and "talked" to with SQL commands, but the specific SQL used to implement "AddEntitlementToAccount" on one database may be very different from the SQL used to implement that command on another database endpoint. Or, things may be different at a higher level, with one endpoint being a database type that uses SQL, and another being an LDAP directory which is "talked" to in LDAP commands, or a Unix system which is talked to via a shell script, or a web service system which is talked to via a REST interface, and so forth.

Consequently the AFX server includes a number of different "connector types" which represent these different ways of connecting to, and talking to, endpoint systems.

Each connector type may be configured multiple different ways—specifically including the details of how the commands are implemented, and which commands from the common language are supported by this endpoint—to create different endpoint definitions. (I.e. in the first example above, two endpoints are defined, both of the database type).

In order for the AFX Server to do the job described above, there are certain additional capabilities the server must have beyond the runtime capabilities described; it must also have the ability to configure all this endpoint data to be used at runtime.

In particular, it must be possible to define these endpoint instances: specifying the type of adapter/connector to use when talking to them, how to connect to them, which of the common commands the endpoint will support, and for each supported command what information the endpoint will require as part of the command and how to implement the command.

In present invention, the AFX server conceptually conies in two parts: a runtime engine that functions essentially as a bag of connectors with configuration data (referred to as "the AFX server" usually), and a tool for defining all of that configuration data (generally referred to as "the AFX Workbench").

Figure 6:
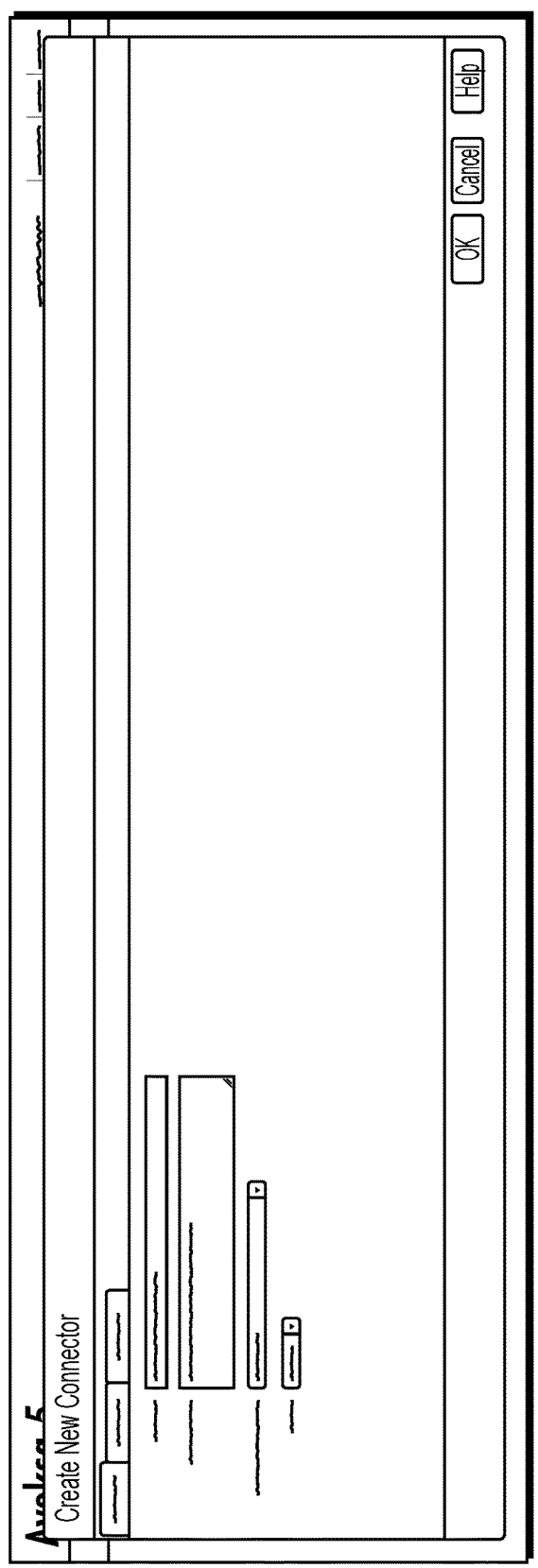
FIG. 6 is a screenshot depicting aspects of an embodiment.
Figure 7:
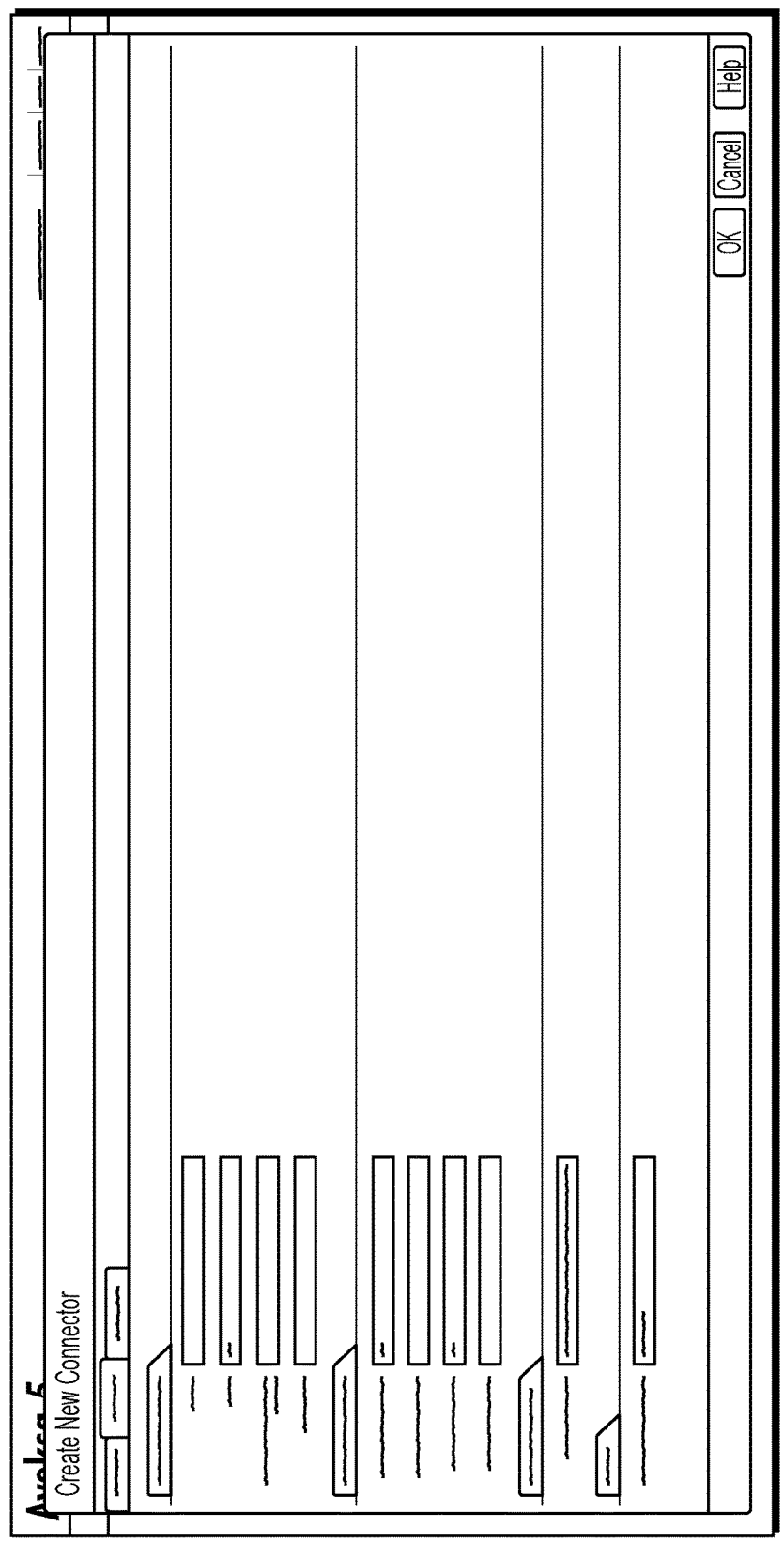
FIG. 7 is a screenshot depicting aspects of an embodiment.
Figure 8:
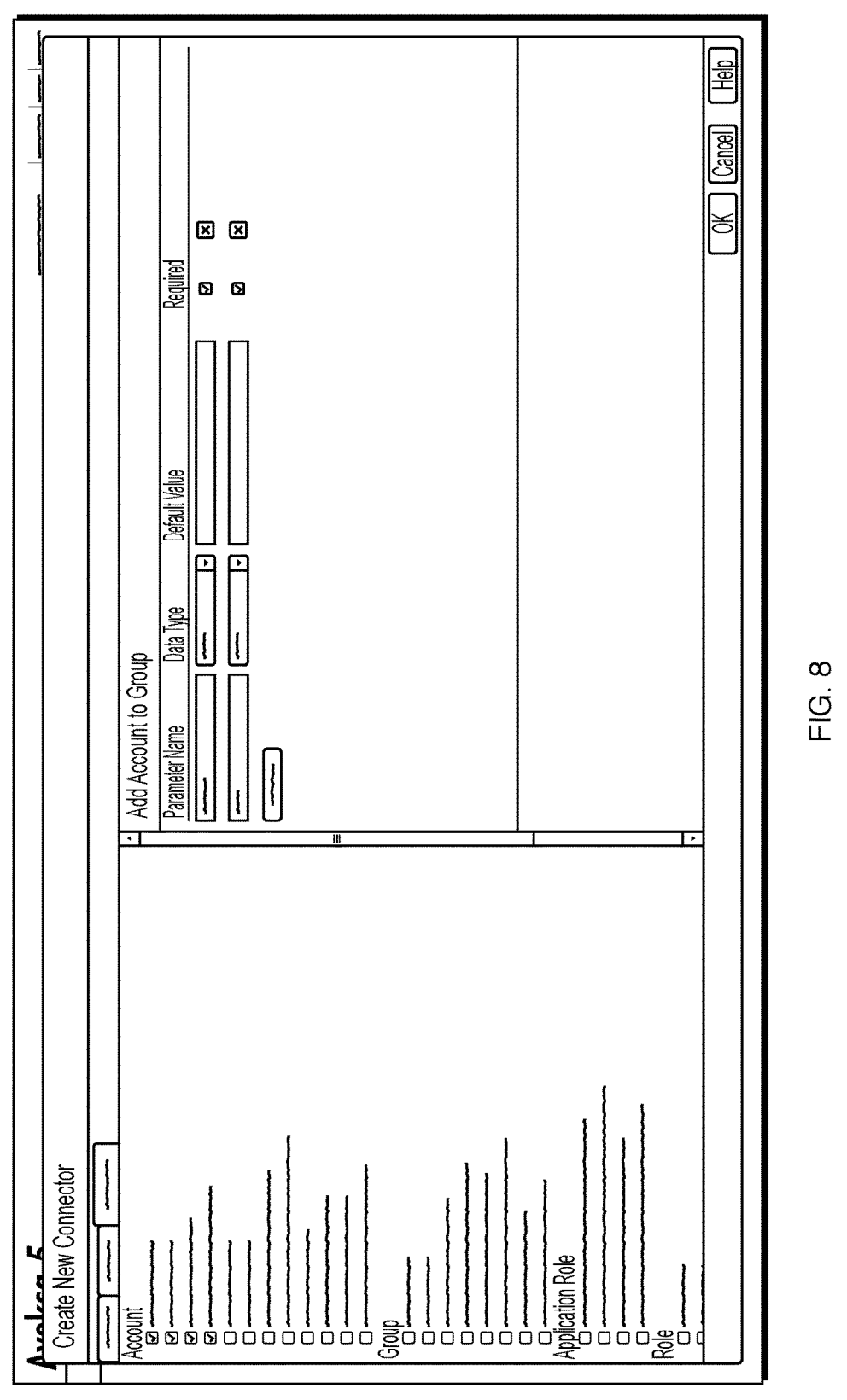

As shown in FIG. 6, with the Workbench one define endpoints, first selecting a name and a type to base the endpoint on. Then filling in the type specific properties for this endpoint, as shown in FIG. 7. One then chooses which commands the endpoint will support from the common list, as shown in FIG. 8. For each command, one defines a set of "required parameters" that must be supplied along with the request. For example, to implement the "AddEntitlementToAccount" command on a database type connector one might require the account name, the entitlement action, and the entitlement resource. one would define these three required parameters as part of the implementation of AddEntitlementToAccount. One may also define optional parameters if one wishes, that might also be used in the fulfillment, if present.

Figure 9:
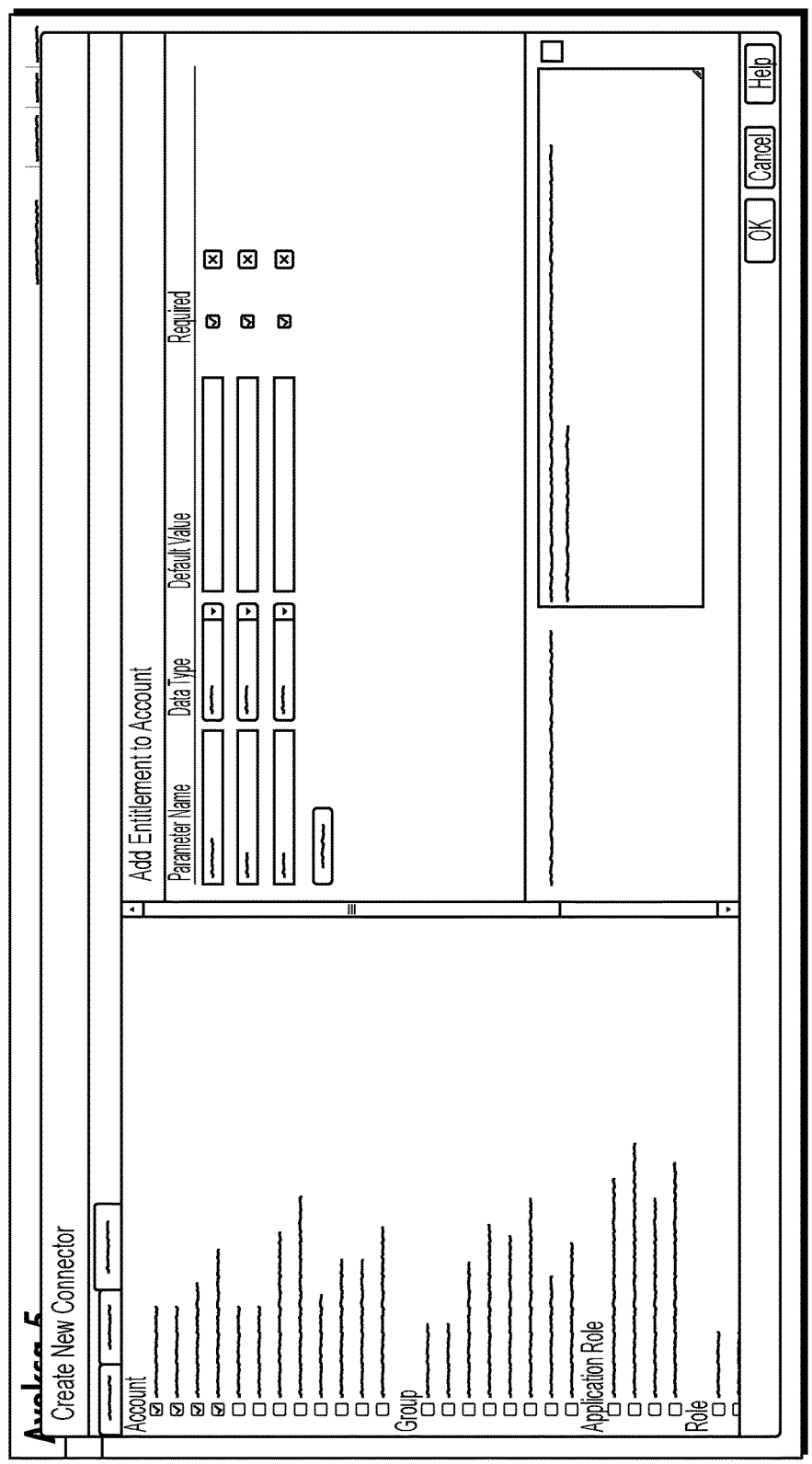
FIG. 9 is a screenshot depicting aspects of an embodiment.

One then defines the endpoint-type specific implementation details to actually make the command happen on the endpoint. Some endpoints may not require this configuration. For a database-type endpoint, this might be a SQL statement or series of SQL statements, which refer to the required parameters. For a Unix system this might be a shell script to run, which uses the required parameters as variables, and so forth. As shown in FIG. 9, an example of a simple SQL case of a database endpoint is illustrated.

Once a user creates an endpoint definition, and fills in all the details for the supported commands, the user creates what can be referred to as "the endpoint contract." One essentially has an endpoint name, and a list of commands that AFX says it can fulfill automatically for that endpoint if, and only if, the incoming command requests include correct values for all required parameters.

It is the ACM server's job to understand how to turn business-level change requests into a series of atomic change items, and then to use these "endpoint contracts" to turn the atomic change items into a series of AFX command requests with all required parameters, and any optional one, filled in. It is the AFX Server's job to received these command requests, and fulfill them by connecting to the endpoint systems and making the requested changes, using the parameter information provided with the request.

The AFX Workbench lets a user define the endpoints and their contracts, and the AFX runtime Server handles incoming requests for these endpoints and drives them to fulfillment. The requests are generated by ACM from the change items inside business level change requests. What's missing from the picture so far is the "how" for that step—how does ACM turn a series of atomic change items inside a change request into a series of commands, filled in with the information required by an endpoint contract, to be sent to AFX?

The key is the fulfillment handler that knows how to use metadata to translate change items into endpoint specific commands for AFX. When the job gets to this type of node, the node looks up the information about the AFX endpoint contracts, determines which items can be fulfilled automatically, and sends requests to AFX to do those things.

Saying that the fulfillment handler "looks up the endpoint contracts" implies that this information is available to ACM. This obviously means that at some point ACM got it from AFX, where the contracts are defined.

Also, saying "sends the requests to AFX" implies that the fulfillment handler knows "where" the AFX server is, and how to send commands to it.

Figure 10:
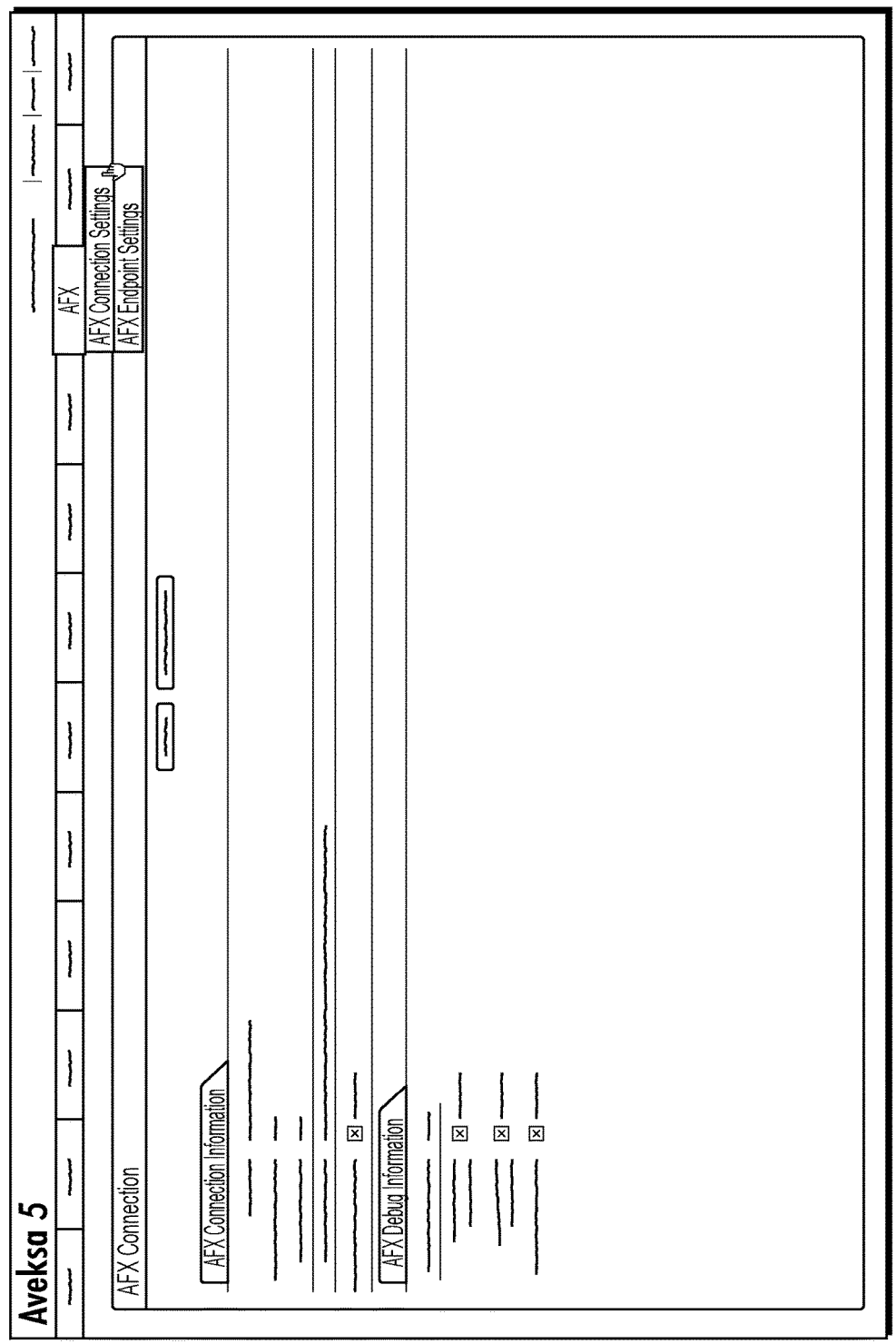
FIG. 10 is a screenshot depicting aspects of an embodiment.

To make both of these things work one needs a way to configure ACM with information about where the AFX server is, and how to talk to it. This isn't complex information: host and port information is primarily all that's required. This is presented in a new configuration screen available to system administrators, as shown in FIG. 10. The screen allows one to configure where the AFX server is, and which ports it is using for two different kinds of communication. The Control port is where ACM sends requests for information about the AFX server itself, while the Command port is where ACM sends the request commands for changes to endpoints systems. The screen has a test button which allows one to verify this information. From here one can globally enable/disable automatic fulfillment, and set some logging options as well.

Figure 11:
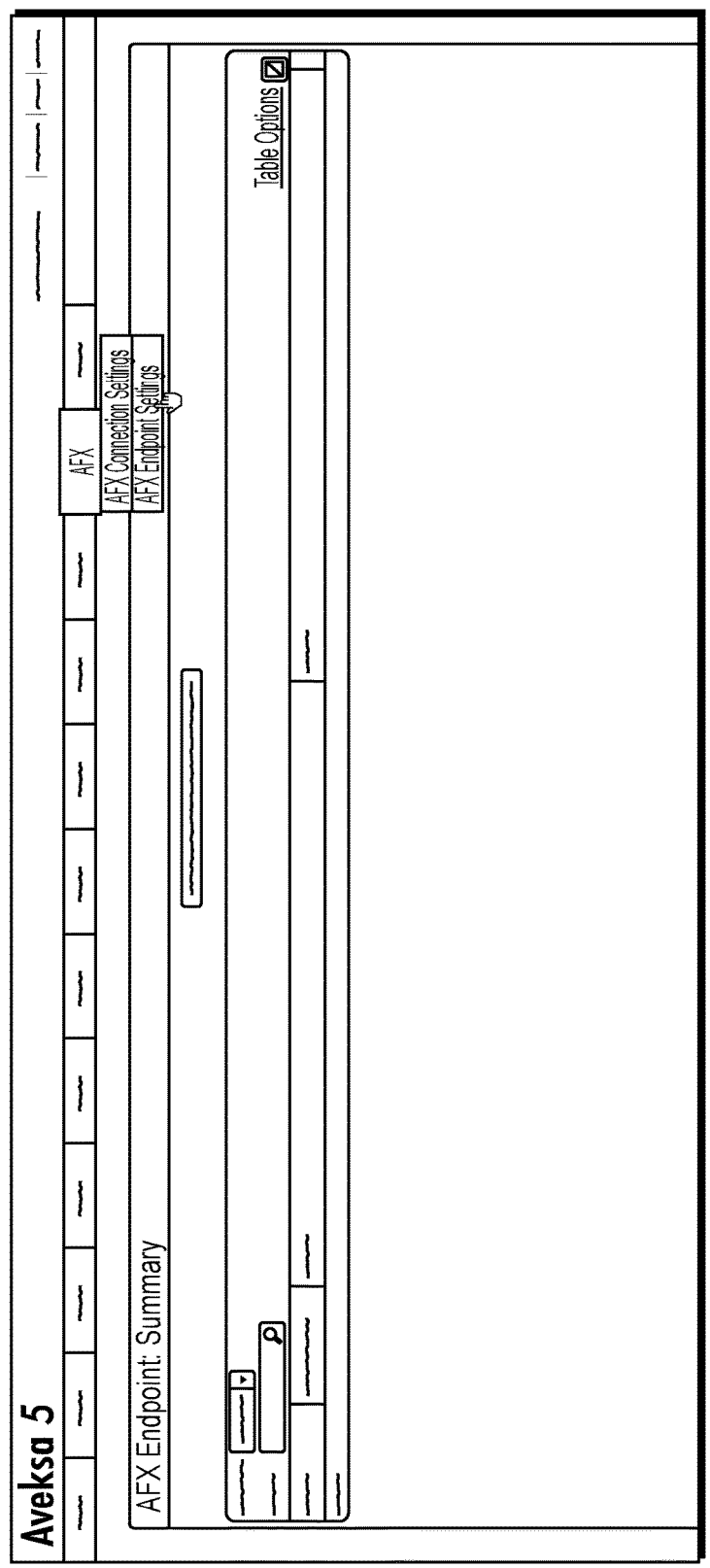
FIG. 11 is a screenshot depicting aspects of an embodiment.
Figure 12:
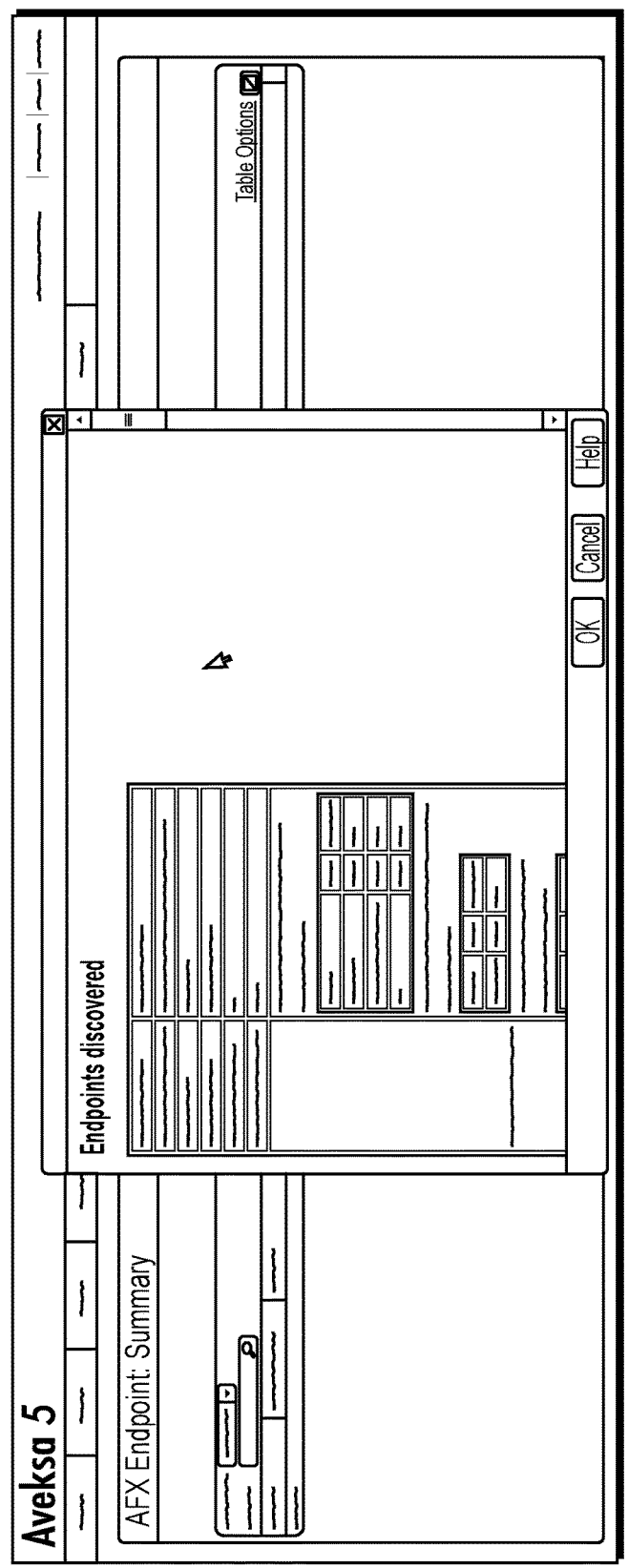
FIG. 12 is a screenshot depicting aspects of an embodiment.

The AFX integration menu inside ACM also has a "AFX Endpoint Settings" item on it. Selecting that takes one to the list of endpoints that ACM knows about, as shown in FIG. 11. The screenshot also has a button for "discovery. When this button is pressed, a command is sent to the AFX server (to its control port) asking it to send back the list of endpoints and their contract information. This is copied into ACM's database, so that ACM has a record of all available endpoints, the commands each supports, and the list of parameters required for each command. ACM only updates its metadata when the returned information includes contracts for new endpoints, or new versions of contracts for endpoints ACM already knew about, as illustrated in FIG. 12.

Figure 13:
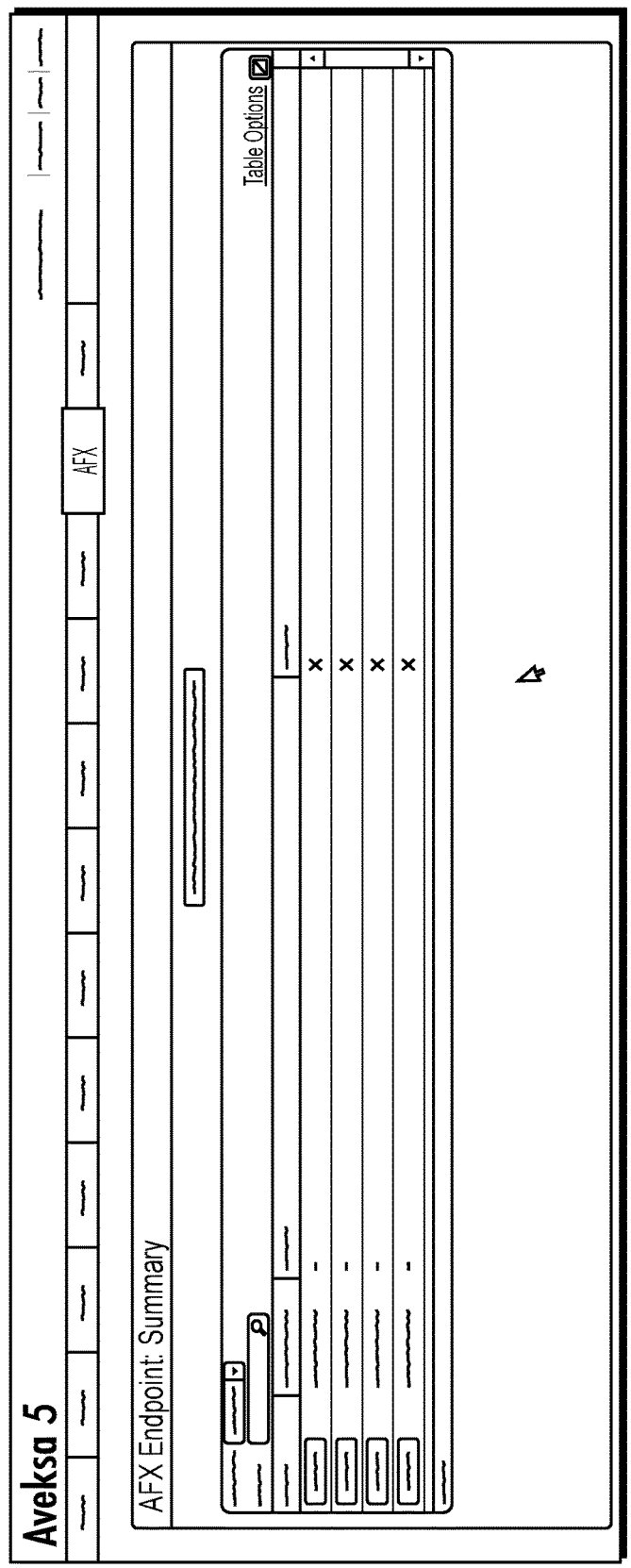
FIG. 13 is a screenshot depicting aspects of an embodiment.
Figure 14:
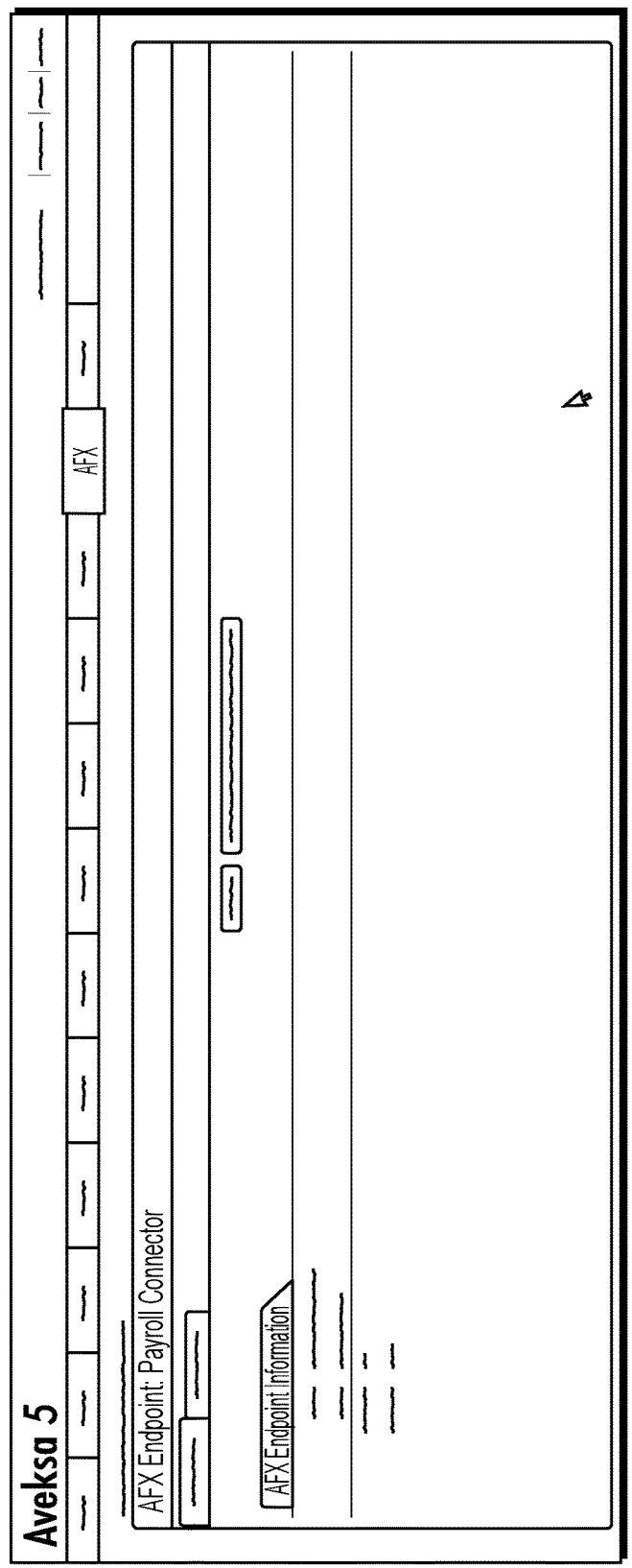
FIG. 14 is a screenshot depicting aspects of an embodiment.
Figure 15:
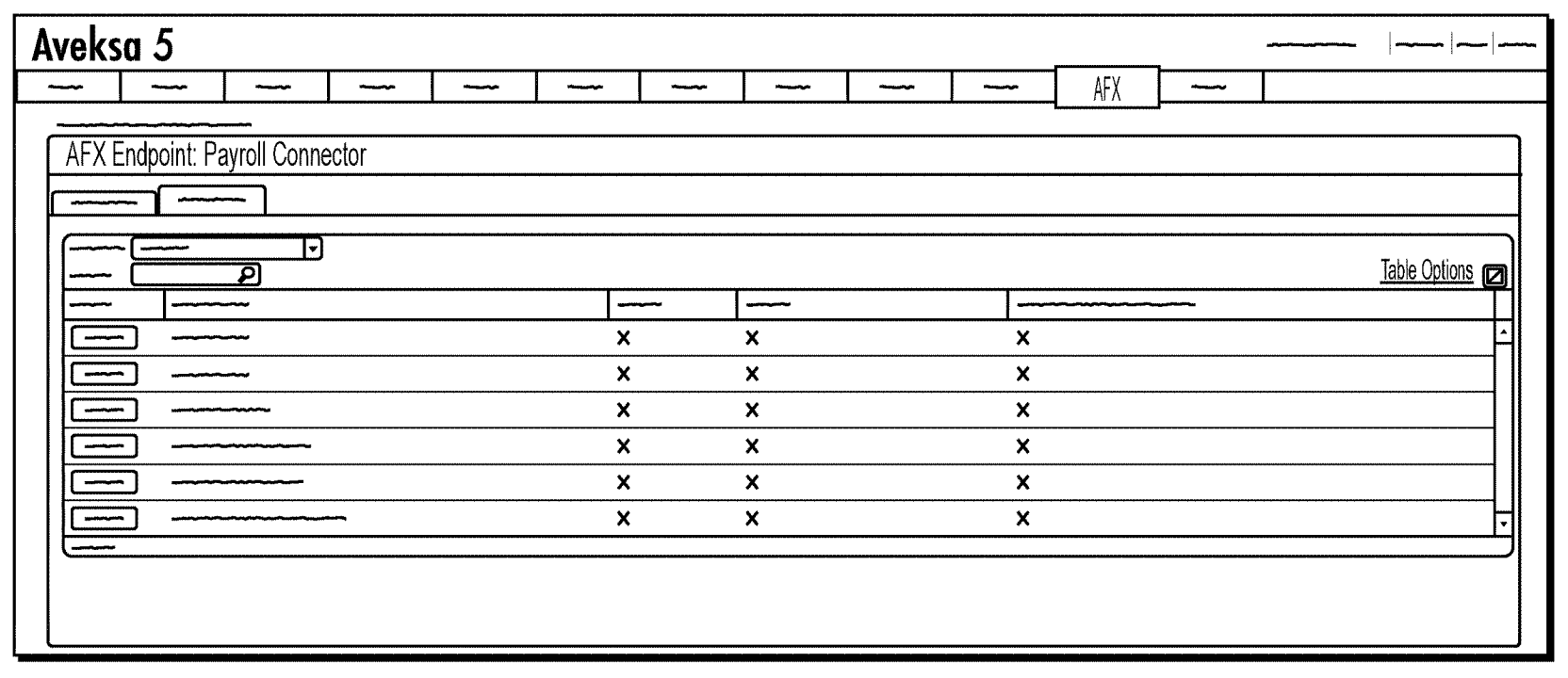

By default ACM considers each endpoint "disabled" (i.e., it will not send automatic fulfillment requests to the endpoint), so an administrator needs to enable each endpoint as it is configured inside of ACM, as shown in FIG. 13. Clicking into any endpoint in the list shows both some simple details about the endpoint, and the commands that ACM has discovered the endpoint to support. ACM defaults to considering each individual endpoint command as disabled (change items of the corresponding type will not be sent for automatic fulfillment) until it is explicitly enabled, as shown in FIG. 14 and FIG. 15.

Figure 16:
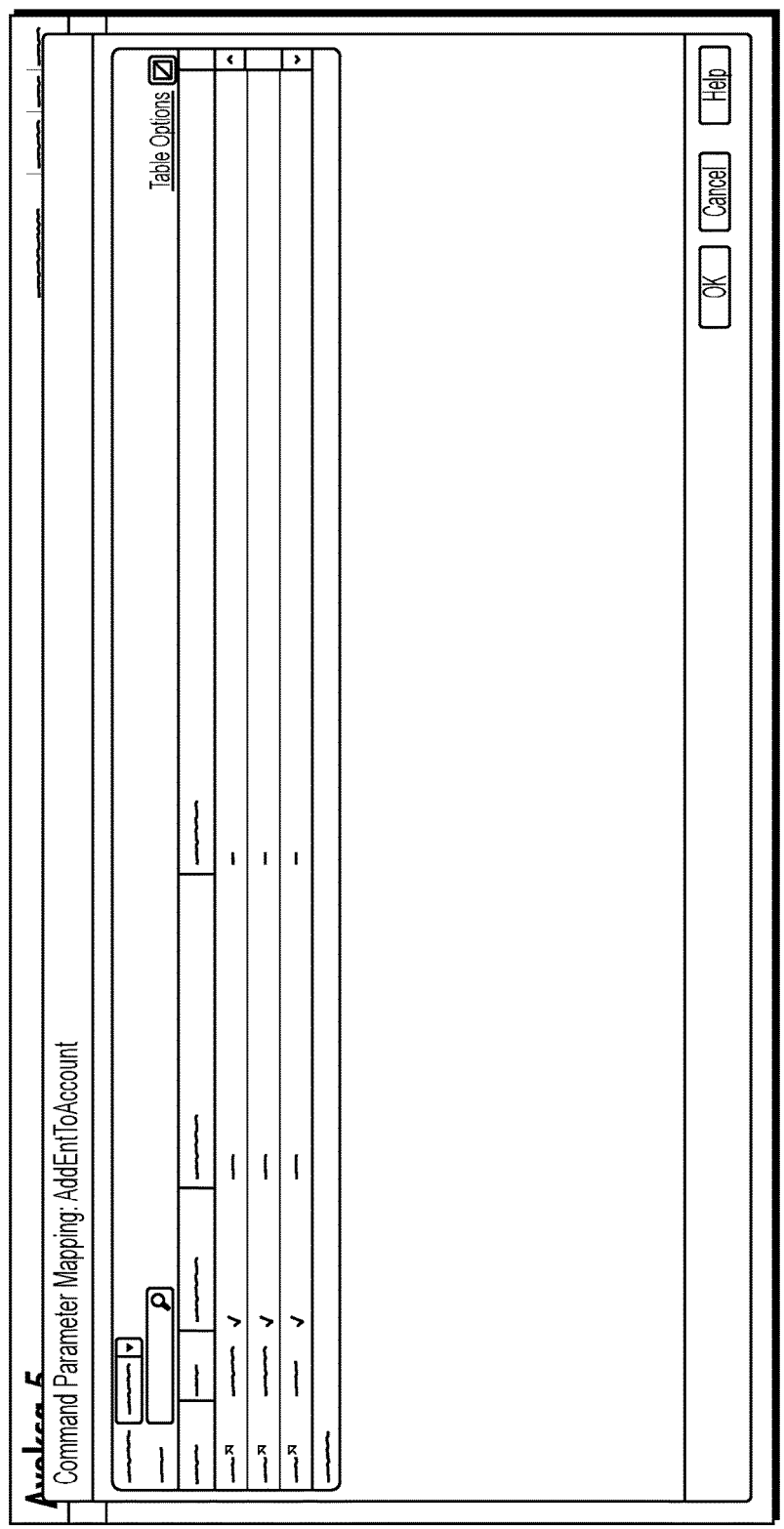
FIG. 16 is a screenshot depicting aspects of an embodiment.

Commands cannot be enabled inside ACM until all of their required parameters have been mapped. Essentially this means that someone has to have configured information in ACM that describes how the required parameters for the command are to be filled in. Clicking on each command brings up the screen for mapping the parameters of each command, as illustrated in FIG. 16. For example, if an LDAP endpoint has a "AddAccountToGroup" command that requires a parameter called "AccountDN" which has to contain the DN of the account to add, and a parameter called "GroupDN" with the DN of the group to add it to, then mapping that command might involve configuring ACM to use the name of the Account associated with the change item for the AccountDN parameter, and the DN attribute of the group associated with the change item for the GroupDN parameter.

Figure 17:
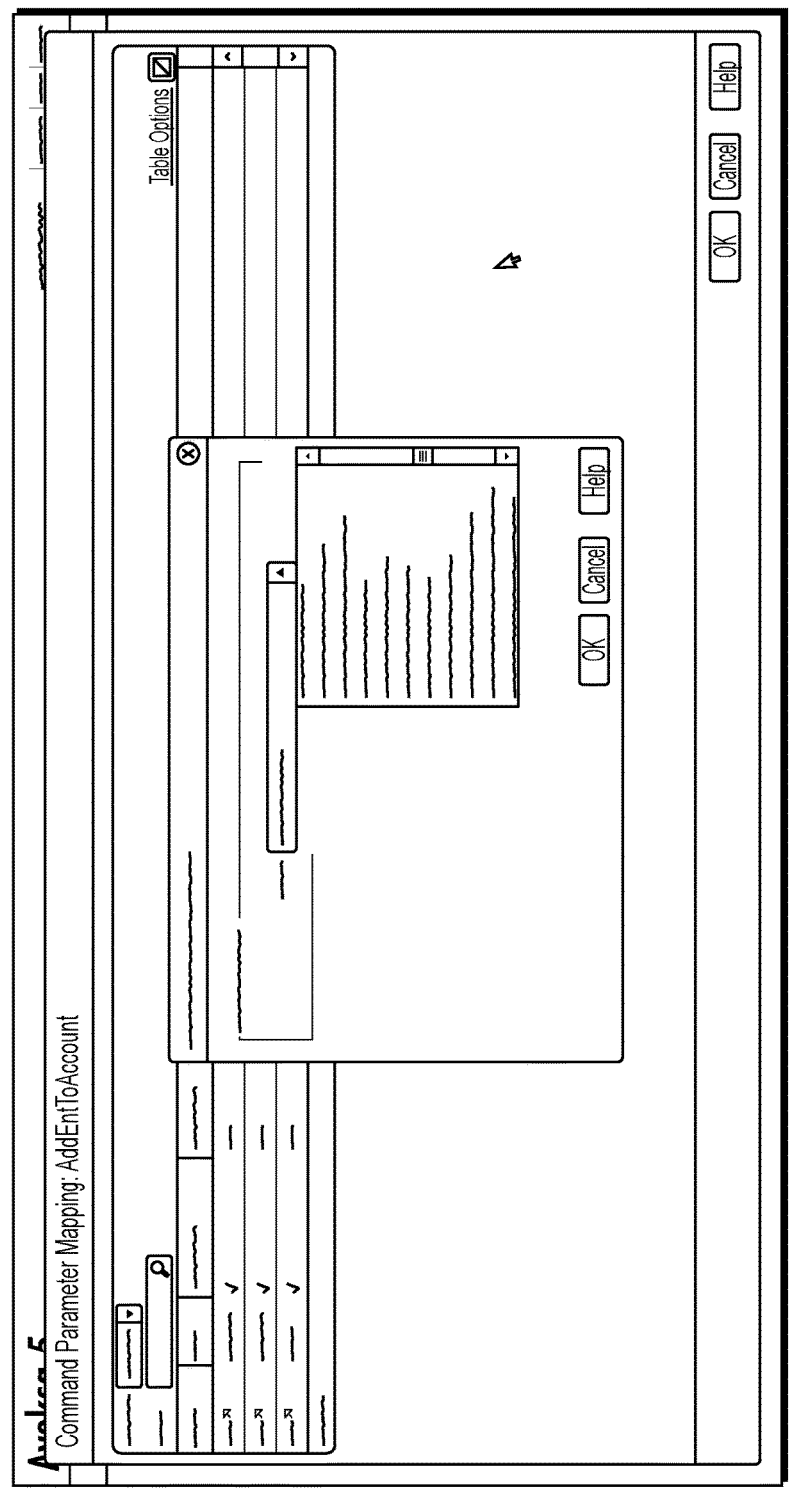
FIG. 17 is a screenshot depicting aspects of an embodiment.

Parameters are mapped by clicking the Action link in the table, and then editing the value in a popup. The popup includes a drop down pastelist of well-known variables that will be substituted at runtime with values relevant to the particular change item that's being turned into a command. For example ${Group.dn} would be replaced with the attribute named "dn" from the group involved in an AddAccountToGroup item. The contents of the pastelist depend on the type of command the parameter is for—the adjust dynamically to include all the available options. An example is shown in FIG. 17.

Figure 18:
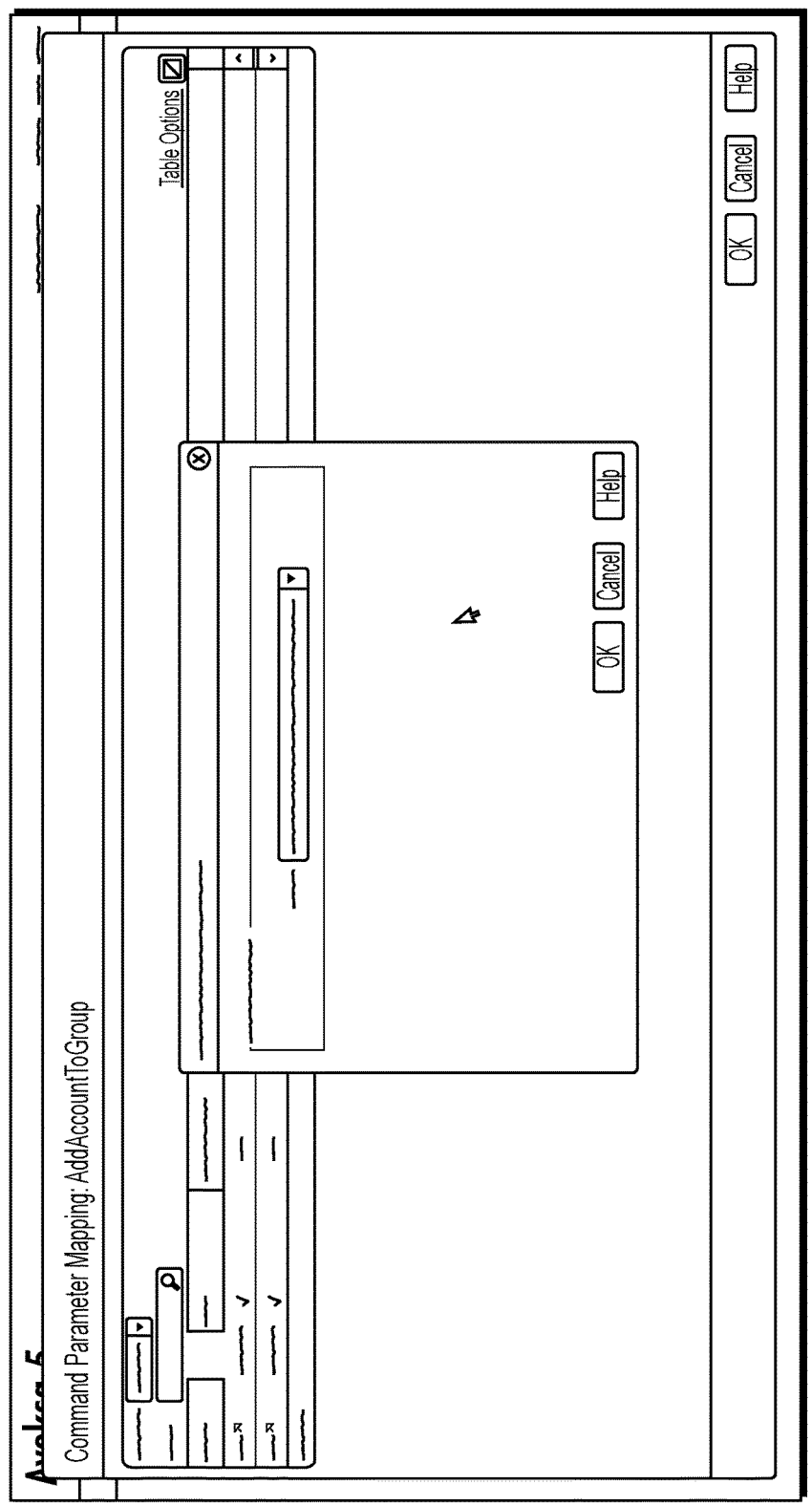
FIG. 18 is a screenshot depicting aspects of an embodiment.

On these mapping screens the value mapped can be a variable expression referring to data ACM has (like information about the account, user, or other objects involved in the change item we're creating a command for, or information from a form that was presented to the user as part of creating the change request, or information set during workflow processing into workflow variables), a string literal, or a combination of literal strings and variables. As shown in FIG. 18, for example, we're building a DN by doing substitution inside a string literal.

Figure 19:
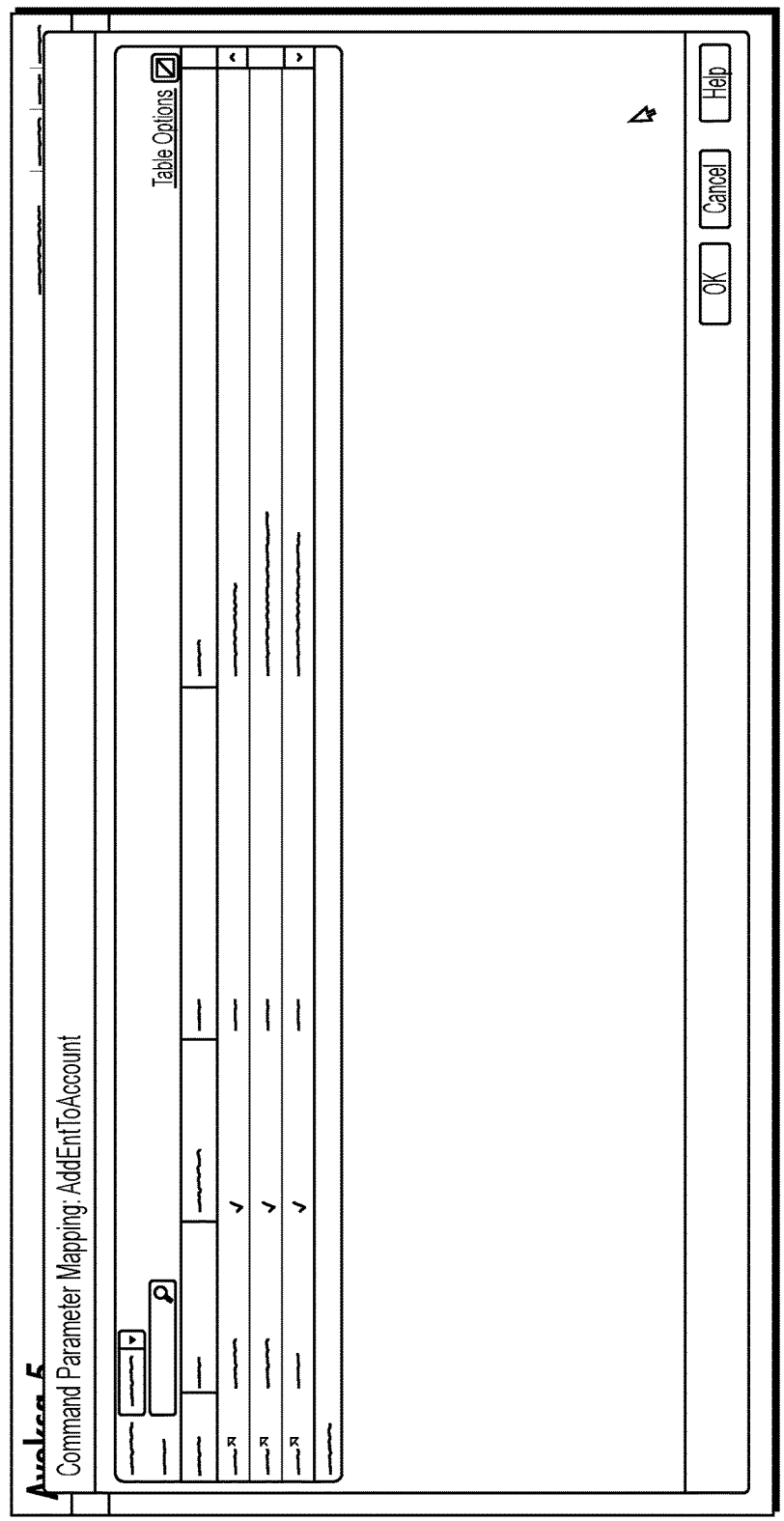
FIG. 19 is a screenshot depicting aspects of an embodiment.
Figure 20:
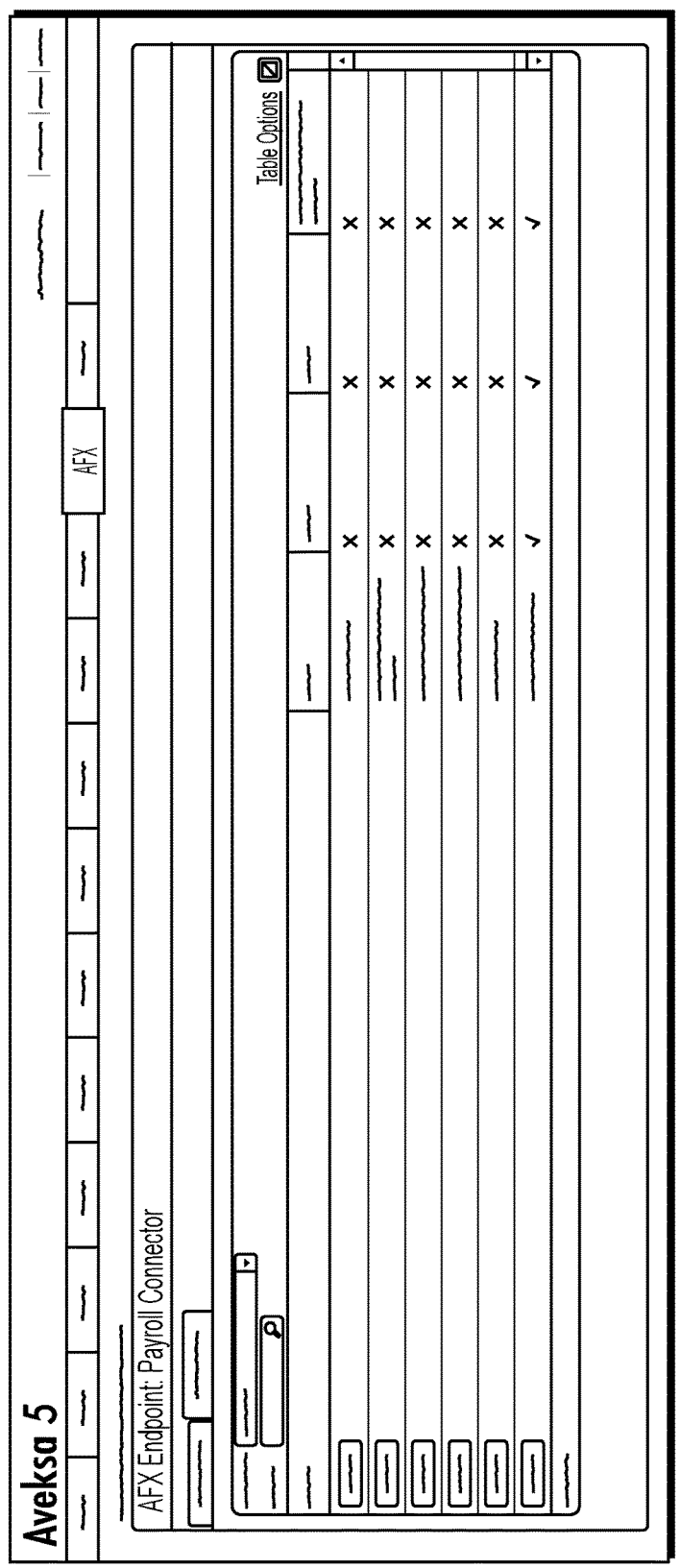
FIG. 20 is a screenshot depicting aspects of an embodiment.

Once all the required parameters for a command are mapped, then the command can be enabled, as shown in FIG. 19 and FIG. 20.

Figure 21:
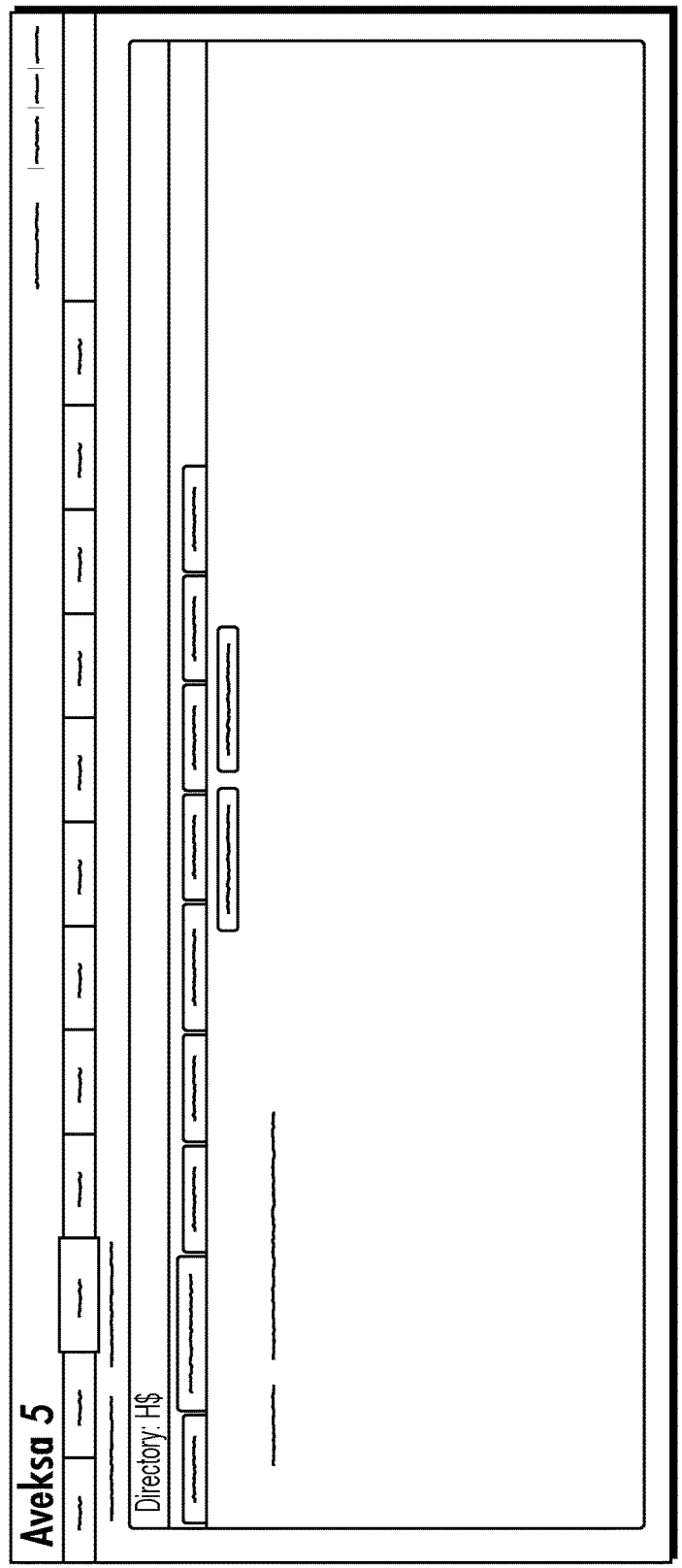
FIG. 21 is a screenshot depicting aspects of an embodiment.

All of the discussion of metadata above about what is enabled for automatic fulfillment, and how to map the parameters, is based on the notion of an endpoint. However, ACM doesn't deal in endpoints, it deals in Business Sources, like Applications, Directories, Role Sets, Data Resource Sets, and so forth. The introduction of AFX business source object detail views have a tab that is used to set an "endpoint binding". This essentially says "when automatically fulfilling requests related to entitlements from this business source, use the specified AFX endpoint," as shown in FIG. 21.

Figure 22:
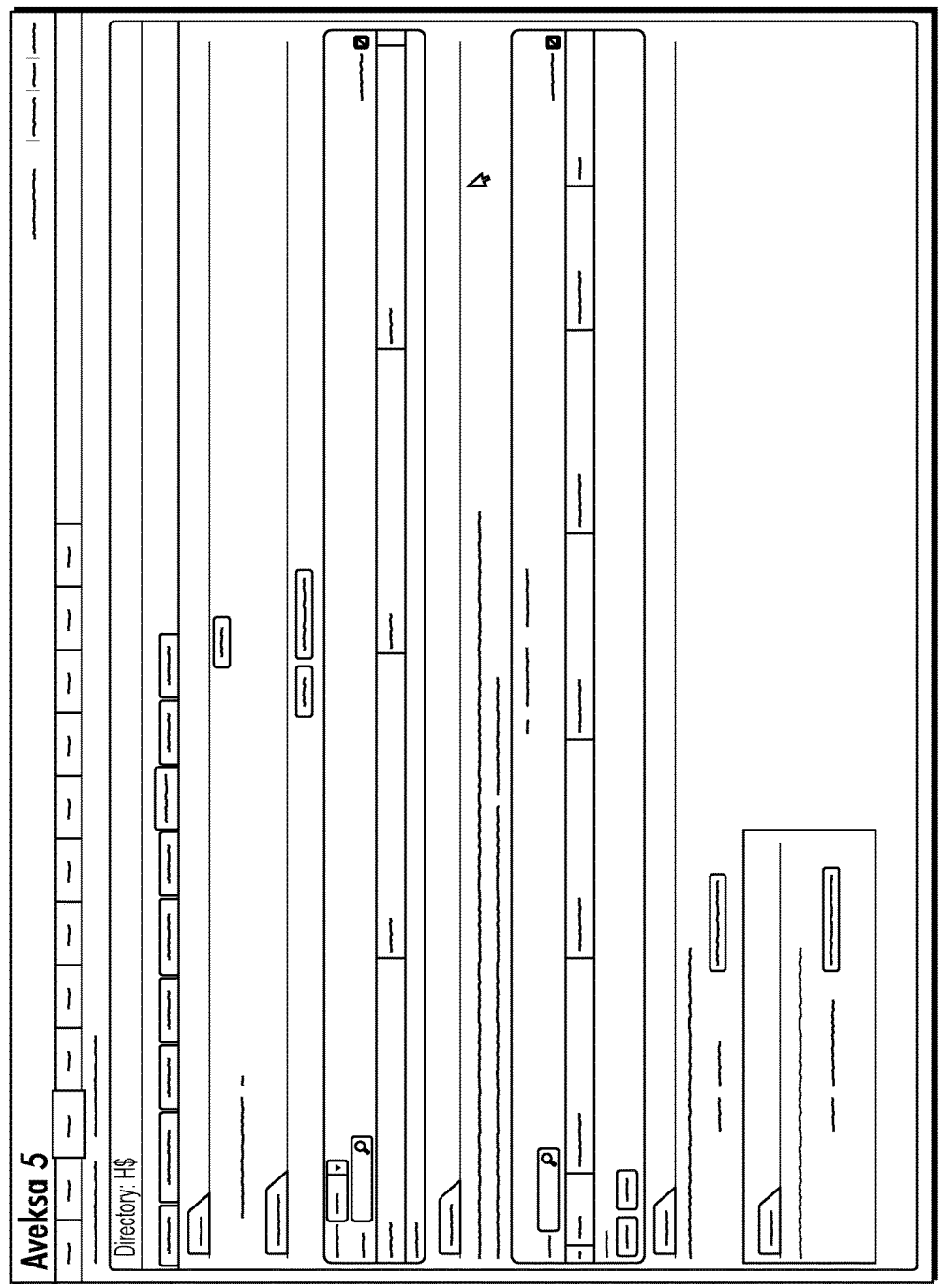
FIG. 22 is a screenshot depicting aspects of an embodiment.

Additionally, when the business source is bound to an endpoint, it likely makes sense to set the fulfillment process used by this business source to be one that involves the AFX Fulfillment Handler. If not, the fulfillment process won't know to use this endpoint metadata, as shown in FIG. 22.

The AFX general configuration screen in ACM, along with the host and port, also includes a "callback URL." This is the address that AFX will use to send information back to AFX about the success or failure of command requests.

In cases where commands fail, one wants to be able to have the activity underlying the request "fall through" to manual processing.

In cases where commands succeed, we want AFX to callback, since this allows one to update the status of the original business request to indicate that the change has been made in the endpoint system. This is analogous to the user indicating that they have performed a manual activity in non-automated fulfillment.

As mentioned above, in order to get this automatic fulfillment one needs to use a fulfillment process that includes the AFX fulfillment handler.

Considering the expansions to ACM around creating object in governed system, implicit creation of accounts, and dependent object creation, this process combines the "traffic management" of the Ordered Fulfillment Handler, and the automatic fulfillment of the AFX Fulfillment Handler.

Figure 23:
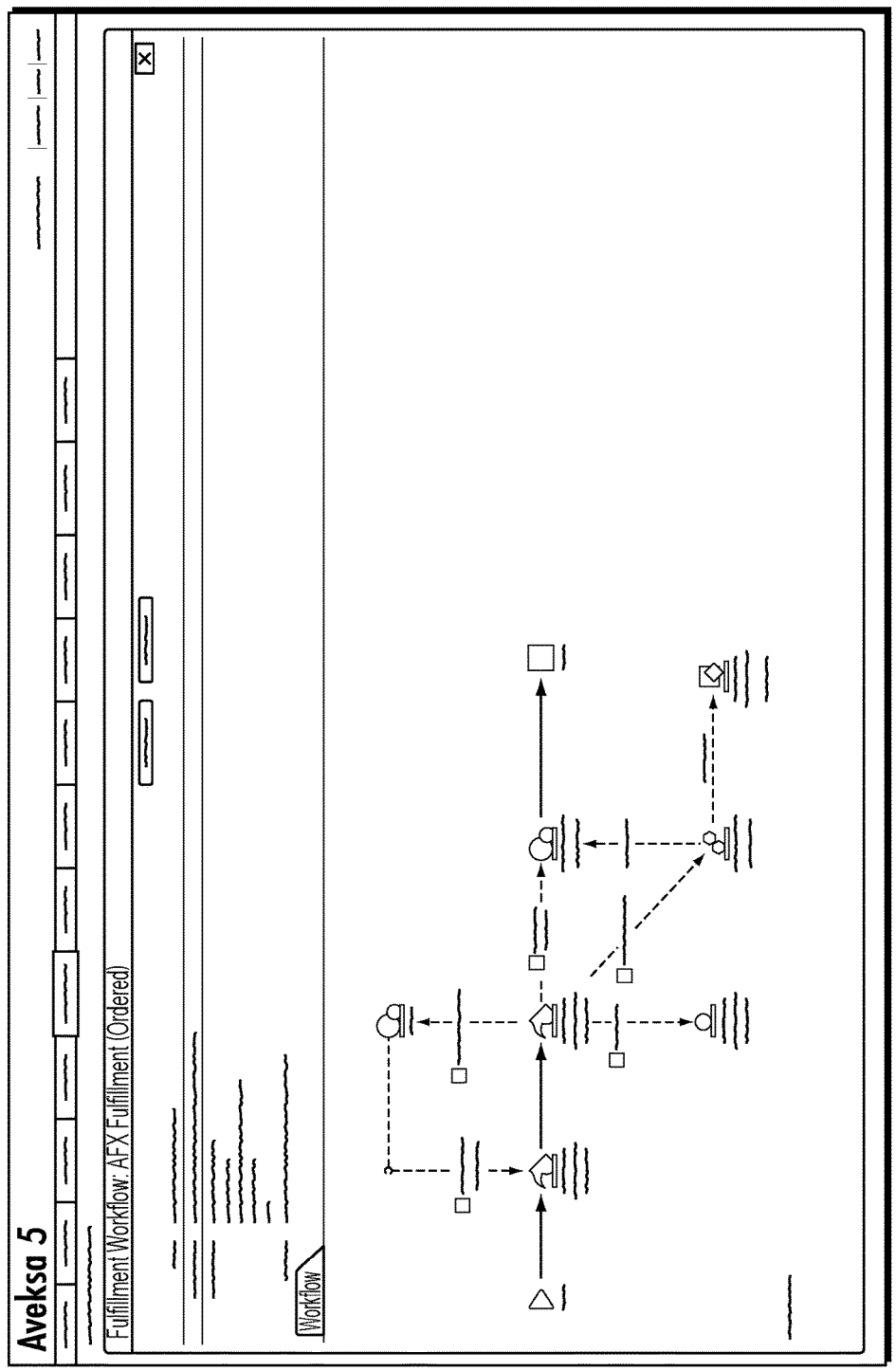
FIG. 23 is a screenshot depicting aspects of an embodiment/.

The out of the box (OOTB) fulfillment process for AFX fulfillment, with dependent object support, is illustrated in FIG. 23. This is very similar to the same process for manual fulfillment, except that each loop around now first tries to automatically fulfill anything that's "ready" via the AFX Fulfillment Handler before going to the ordered fulfillment handler.

If the first automated fulfillment pass completes everything we pass right through the ordered handler to wait for verification.

If only some items can be sent for automatic fulfillment on the first pass, and the remainder need manual fulfillment, then the Ordered Fulfillment Handler routes the unhandled items to manual, and we wait for verification on the automatic ones.

If only some items can be sent for automatic fulfillment on the first pass, and the remainder need are dependent on some object existence, then the Ordered Fulfillment Handler routes the unhandled items to the wait state. When the objects are created, we pass through the AFX Handler again, and the dependent items are that are now ready are sent out for fulfillment.

Note that wait node now also treats AFX Callbacks equivalently to someone using the Perform operation to manually indicate something has been done. If AFX calls back to say something has been created, that will cause us to update the object state to created, and allow any dependent events to kick off. If AFX calls back to say something has failed, then dependent events are cancelled, just with manual rejections, and so forth.

In summary, in order to enable a new endpoint for automatic fulfillment the following steps of the present invention occur.

AFX Side
  Create endpoint on AFX workbench
  Select supported commands
  For each command define required and optional parameters and endpoint type specific implementation details
ACM Side
  Run discovery to find new endpoint and create metadata for it in ACM
  For each command one wish to automate, fill in mappings for at least all required parameters, and enable the command
  Enabled the endpoint
  Bind the endpoint to a business source
  Make sure the business source uses a fulfillment process that uses the AFX Fulfillment Handler An exemplary flow of a simple request proceeds as follows.
  Jim edits John's access in ACM and adds 2 entitlements from Application A, and one group from Directory B
  Jim submits the request
  The system checks that it can find one (and only one) account for John in Application A, and Directory B. If it finds more than one, it asks Jim to specify which of John's accounts he wants to change.
  The system generates a change request, which has three atomic change items in it: two AddEntitlementToAccount items, and one AddAccountToGroup item
  The CR enters the request workflow, and works its way through the various approvals and other steps in the workflow until it gets to the fulfillment phase
  The system looks up the Application-specific fulfillment for Application A and finds that it uses the Default AFX Fulfillment process. It creates a job with the two AddEntitlementToAccount items in it, and sends the job into an instance of that process. It looks up the fulfillment for Directory B and finds it uses a different process, AD AFX Fulfillment, so it creates a job with the one AddAccountToGroup change in it, and sends the job into that process.
  The job in the Default AFX Fulfillment process gets to the fulfillment handler node, where control passes to the AFX Fulfillment Handler. The handler looks to see if 1) AFX fulfillment is on globally, 2) there is an endpoint associated with Application A, 3) the endpoint is enabled for AFX fulfillment, 4) the endpoint has support for the AddEntitlementToAccount command, 5) the command is mapped and enabled, and 6) all the mappings can be evaluated successfully. If all of that is true, it will create AFX command requests for each of the changes, and send them to AFX. AFX will respond with an "AFX ID" for each request, which the handler will store along with the change item in ACM's database.
  The job in the AD AFX Fulfillment process does the same series of 6 checks, and if it ends up with an enabled command with parameter mappings, it generates the AddAccountToGroup command and sends the request to AFX, which will accept and enqueue the request, sending back an AFX Id.
  On the AFX side, the "front door" accepts each command request coming in from ACM, validating the form of the command request, ensuring that the request is destined for an endpoint known to the server, creating an ID for each one, and responding with the ID.
  The request is then placed in an endpoint specific queue, where is it picked up either automatically, or on schedule. The adapter for the endpoint type will then use the configured implementation details to fulfill the request. (In the case of the AddEntitlementToAccount requests, these might be against an endpoint that's of the database type, so the configured implementation details would be a SQL statement written in terms of the command parameters that would be run against the endpoint database),
  Assuming the command fulfillment succeeds, the AFX server will then use the callback URL (included as part of every request) to send a response to ACM indicating the request succeeded. If it fails for some reason, the AFX server will prepare a failure response and send that to the callback URL. In either case, the response will include the AFX Id of the command request this callback is about.
  ACM will lookup that ID and determine the change item to update, marking it either as completed or failed. The workflow process can be configured to either believe a success response implicitly, or to wait for a collection to verify the change. Similarly the workflow process will dictate what to do in the case of a failure of the item—most likely it will be set up to "fall through" to manual activities, allowing a recovery in the case of error situations
  Note that the AFX callback plays exactly the same role as someone with a manual activity assigned to them using the "perform" GUI to indicate that a particular activity has been fulfilled.

An exemplary flow of a simple request with implicit account creation proceeds as follows.
  For the scenario where Jim requests a new entitlement for John in the payroll system, where John does not currently have an account, assuming AFX is in place and configured to do automated fulfillment for Payroll. The Payroll application has an implicit account creation policy that says accounts can be created automatically, without the need for a form.
  6) Jim edits John's access and adds 1 entitlements from Payroll
  7) Jim submits the request
  8) The system checks that it can find one (and only one) account for John in Payroll. Not finding one, it looks for the implicit account creation policy, and finds it can create the account. No form is specified, so it just displays a confirmation screen notifying Jim that an account will be created as part of his request, and asking him to confirm he's OK with it.
  9) Jim says OK
  10) The system generates a change request, which has two atomic change items in it. The first is a "create account" item for John's Payroll account, and as part of creating it a pending account entry is added to the system as a placeholder for this account. The system looks up any defined "pending account attributes" for Payroll and calculates their values as part of this process. The second change item is an "add entitlement to account" item for adding the entitlement to John's account. The second item is dependent on the John's Payroll account existing.

11) The CR enters the request workflow, and works its way through the various approvals, including an additional approval that is only required for account creation, and other steps in the workflow until it gets to the fulfillment phase 12) The system looks up the Application-specific fulfillment for Payroll and finds that it uses the Default AFX Fulfillment process. It creates a job with the two items in it, and sends the job into an instance of that process.

13) The job in the Default AFX Fulfillment process gets to the fulfillment handler node, where control passes to the AFX Fulfillment Handler. The handler determines that the "create account" item is ready to go, and nothing else in the job is. The handler looks to see if 1) AFX fulfillment is on globally, 2) there is an endpoint associated with Application A, 3) the endpoint is enabled for AFX fulfillment, 4) the endpoint has support for the CreateAccount command, 5) the command is mapped and enabled, and 6) all the mappings can be evaluated successfully. If all of that is true, it will create AFX command requests for the account creation change, and sends it to AFX. AFX will respond with an "AFX ID" for each request, which the handler will store along with the change item in ACM's database. Nothing is done with the other change item.

14) On the AFX side, the "front door" accepts each command request corning in from ACM, validating the form of the command request, ensuring that the request is destined for an endpoint known to the server, creating an ID for each one, and responding with the ID.

15) The request is then placed in an endpoint specific queue for the Payroll endpoint, where is it picked up either automatically, or on schedule. The adapter for the endpoint type will then use the configured implementation details to fulfill the request.

16) Assuming the command fulfillment succeeds, the AFX server will then use the callback URL (included as part of every request) to send a response to ACM indicating the request succeeded. If it fails for some reason, the AFX server will prepare a failure response and send that to the callback URL. In either case, the response will include the AFX Id of the command request this callback is about. Since this is an object creation request, on success AFX will look for the endpoint metadata about what name-value pairs to send back with the callback, and will use the endpoint-specific implementations defined for each one to determine the values.

17) ACM will lookup that ID and determine the change item to update, marking it either as completed or failed. In the case of success, ACM will also pick up the additional attribute information, and if there is any will use it update the pending account attributes.

18) Marking the pending account as "Created" will trigger the system to look for any dependent events waiting for that account. It will find the "add entitlement to account" item from out request, and that item will now be triggered.

19) The handler determines that the "add entitlement to account" item is ready to go (and there's nothing else in the job). The handler looks to see if 1) AFX fulfillment is on globally, 2) there is an endpoint associated with Application A, 3) the endpoint is enabled for AFX fulfillment, 4) the endpoint has support for the AddEntitlementToAccount command, 5) the command is mapped and enabled, and 6) all the mappings can be evaluated successfully. If all of that is true, it will create AFX command requests for the add entitlement change, and sends it to AFX. AFX will respond with an "AFX ID" for the request, which the handler will store along with the change item in ACM's database.

20) on the AFX side, the "front door" accepts each command request corning in from ACM, validating the form of the command request, ensuring that the request is destined for an endpoint known to the server, creating an ID for each one, and responding with the ID.

21) The request is then placed in an endpoint specific queue for the Payroll endpoint, where is it picked up either automatically, or on schedule. The adapter for the endpoint type will then use the configured implementation details to fulfill the request.

22) Assuming the command fulfillment succeeds, the AFX server will then use the callback URL (included as part of every request) to send a response to ACM indicating the request succeeded. If it fails for some reason, the AFX server will prepare a failure response and send that to the callback URL.

23) ACM will lookup that ID and determine the change item to update, marking it either as completed or failed.

24) Assuming success, all the items are now complete, and the CR itself will be marked as complete.

Figure 24:
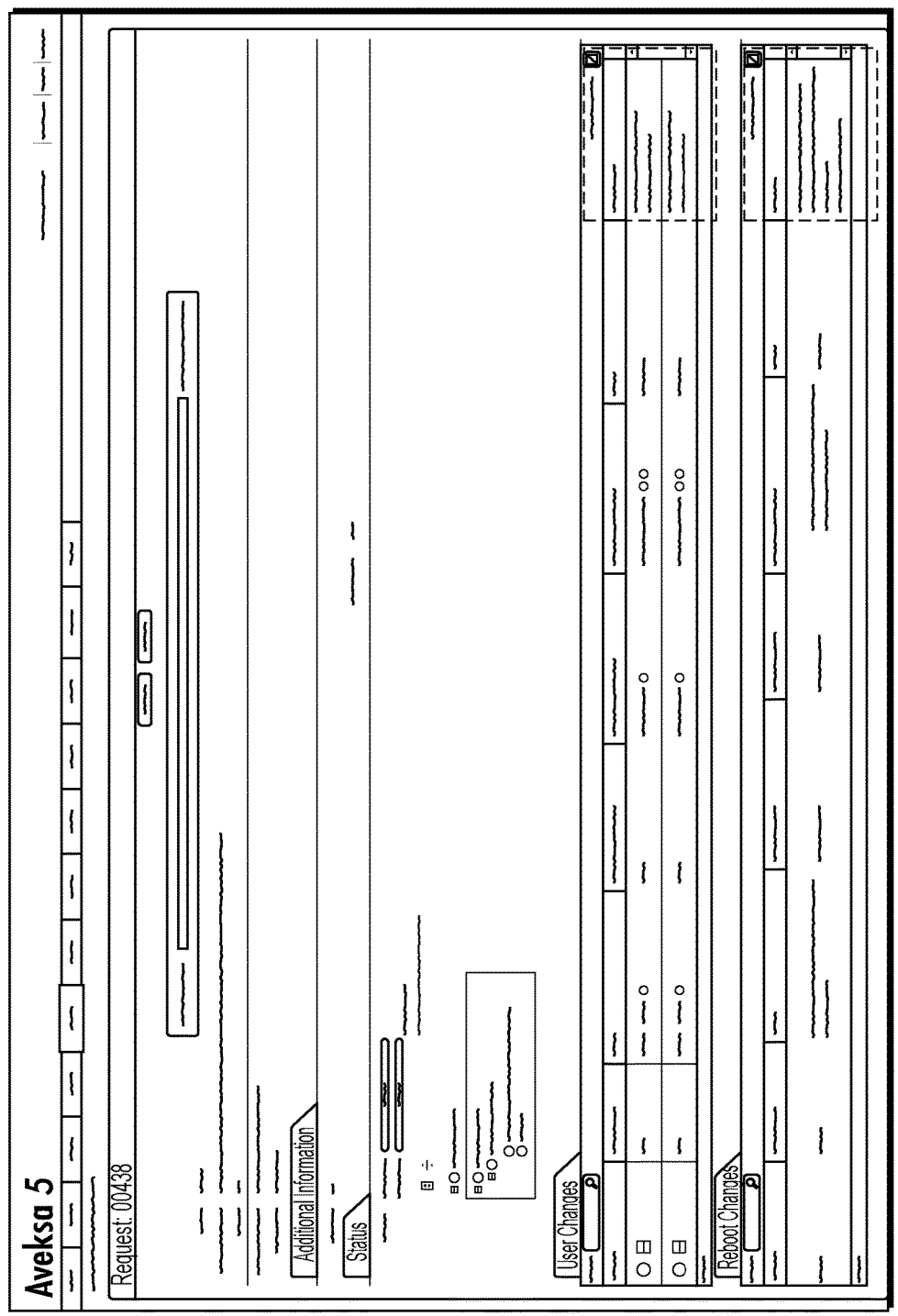
FIG. 24 is a screenshot depicting aspects of an embodiment.

At any point, the details of the request, including fulfillment are available from the request details screen in the UI. The request's info will show that the AFX handler has been involved, and that how the various change items have been split up. The details on each change item have useful information displayed in their comments, such as illustrated in FIG. 24. From the details for the individual change items one can view the actual XML messages sent to and received from AFX. (Details table shows links, which open popups with the XML details).

From the details table one can also request current status information from the AFX server for requests in progress. Clicking these links will send an inquiry message to AFX with the AFX ID of the relevant change item in it, and the response from AFX will be parsed and displayed in a popup. (If the response has a status code, that may also be used to update the stored change item record in ACM's database).

As discussed above, there is a need for the fulfiller to return the "real" value of certain attributes when objects are created. This also applies to the AFX case, but here things aren't as simple as asking the user to provide the values as part of filling in the perform screen.

For automatic fulfillment, this means that the AFX callback for an object creation operation needs to include not just success/failure, but also a set of name-value pairs, that can be used to update the pending object's attributes. When a success callback conies in for a creation change item, the system can look for these additional name-value pairs, and can update the attributes with this information.

In either case, after the success message is received, the attributes are updated to correct values, and the system can continue to the dependent events, confident that the account attributes being used are "real" with respect to the endpoint.

This is particularly important in automatic fulfillment, where attributes of the object may be mapped to required parameters of the dependent events—i.e. if an Account's DN is required in order to add it to a group on an LDAP system, for example. The system can create a pending account entry for the account, and can even create the "Add Account To Group" change item inside ACM to handle it, but when it comes time to generate the AFX command request, what goes into the required "AccountDN" parameter? one want it to be the real DN of the account, not oner best guess from before it was actually created.

Note that the automatic part of this requires AFX to know which names and values to send on object creation, and how to get the values. This is configured through the AFX Workbench as part of the endpoint metadata for endpoints that support create operations. Setting up these name-value pairs is independent of any knowledge of ACM—the responsibility for mapping them into attributes of the pending object lies with the person doing the ACM-side definition.

At a very high level, the AFX Server is a "bag of connectors," in that all the logic around deciding what commands to send, what order to send them in, etc, is handled within the ACM Server.

However, that doesn't mean the AFX runtime server doesn't need to support "enterprise level" functionality. The AFX Server needs to be able to scale with the demand for fulfillment form the ACM server which may get quite high—imagine a review is happening of all the entitlements in an organization, with 1000s of different reviewers simultaneously revoking and adding access, and each of these changes potentially generating automatic fulfillment requests.

The server has a primary "incoming command request" queue that holds all verified incoming commands. This allows the requesting systems to get a quick response to the request, even if the AFX server is backed up with work. This queue can also be configured to be backed by persistent storage for fault tolerance and disaster recovery (i.e., if the AFX Server machine catches fire, the queued up changes don't need to be lost). This also allows tunability as the number of threads servicing this queue can be tuned to handle the appropriate load level.

Request commands that are picked out of this queue and then sent to endpoint specific queues to wait. This allows the processor load associated with each endpoint to be individually tuned, and prevents large numbers of queued operations on one endpoint from blocking operations on other endpoints.

Each endpoint specific queue also has a scheduling function attached, which allows the person configuring the endpoint to determine how often the endpoint will look for items in the queue and process them. For most endpoints this will probably be "handle the events as they come in, as fast as one can", but for some systems there will be reasons to set up things like "process all pending commands after close of business, EST" or "process all pending commands at 2 AM on Tuesday", and so forth. The common scheduling functionality is built in to the OOTB adapters, allowing it to be configured through the Workbench UI without any special programming skills.

For some connector types certain operations should be grouped into logical transactions to support rollback of partial changes if some part of a logical grouping fails. The OOTB adapters are built to handle this.

Additionally, on some systems performance is greatly improved by collecting several operations into a batch and running them with a common infrastructure to avoid the overhead of establishing live connections, and so forth. For these systems, the batching process is built into the OOTB connectors.

There are common enterprise requirements around being able to log request progress, track the progress of a request toward fulfillment, and to report on aggregate request information. Adding automatic fulfillment doesn't obviate any of these requirements, and instead simple extends them into the automatic fulfillment system.

Consequently, the present invention is able to log the progress of the request commands, and interactively track them, associating them with the original requests in the ACM system. The aggregate runtime data is exposed for reporting. All of this is built into each adapter.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here.

What is claimed is:

1. A computer-implemented process for automated fulfillment of change requests used to manage access-control records of business sources, the business sources being applications and/or data collections on respective endpoint computers and using the access-control records to control user access to and use of the applications and/or data collections by computer system users, comprising:
  (1) performing an initial configuration process, including:
   (A) in an Automatic Fulfillment (AF) server:
    (i) creating endpoint connectors on the AF server for communications with respective endpoint computers;
    (ii) selecting respective sets of supported change-request commands for the endpoint connectors; and
    (iii) for each supported change-request command of each endpoint connector, defining (a) respective required and optional parameters and (b) endpoint type specific implementation details for a respective native command used to communicate the change-request command to the respective endpoint computer;
   (B) in a Compliance Manager (CM) server:
    (i) running discovery to find new endpoint computers and create metadata therefor in the CM server, the discovery including receiving information from the AF server for the endpoint connectors and the respective endpoint computers;
    (ii) for each of the supported change-request commands to be automated, filling in mappings for at least all required parameters, and enabling the command;
    (iii) enabling the endpoint computers for automated change-request fulfillment;
    (iv) creating endpoint bindings to bind the endpoint computers to the respective business sources; and
    (v) ensuring that the business sources use an automated change-request fulfillment process that uses the endpoint connectors of the AF server; and
  (2) during subsequent operation in which change requests are generated for respective target business sources, performing respective instances of the automated change-request fulfillment process for each of the change requests by:
   (C) at the CM server:
    (i) executing a set of checks to determine that the automated change-request fulfillment process is enabled and has command parameter mappings for a configured change-request command to be used to communicate the change request to the target business source;

(ii) based on the set of checks being satisfied, transmitting the configured change-request command to the AF server, the change-request command identifying an endpoint computer bound to the target business source; and (D) at the AF server:
(i) receiving the change-request command from the CM server;
(ii) based on the identity of the endpoint computer in the received change-request command, selecting the respective endpoint connector for the identified endpoint computer and enqueueing the change-request command on the selected endpoint connector; and
(iii) by the identified endpoint connector when processing the enqueued change-request command, issuing the corresponding native command defined for the change-request command to the endpoint computer to effect the requested change on the target business source.

2. The computer-implemented process of claim 1, wherein defining the endpoint type specific implementation details for a native command for a given endpoint computer includes adding a command string to the respective endpoint connector, the command string containing (i) the native command for communicating the respective change-request command to the given endpoint computer, and (ii) one or more variable names for the required and optional parameters used communicate the change-request command to the respective endpoint computer.

3. The computer-implemented process of claim 2, wherein the access-control records of the business source on the given endpoint computer are contained in a database, and the command string includes a database query statement.

4. The computer-implemented process of claim 1, further including, in the CM server, becoming configured with AF server information enabling the CM server to communicate with the AF server, the AF server information including information for (i) a control port via which the CM server obtains information about the AF server itself, and (ii) a command port via which the CM server sends the change-request commands to the AF server.

5. The computer-implemented process of claim 4, wherein the AF server information includes a callback address for the CM server, and further including, in the CM server, sending the callback address to the AF server for use by the AF server in returning change-request responses to the CM server.

6. The computer-implemented process of claim 1, further including, in the CM server, becoming configured with parameter mapping information describing how the parameters of the native commands of the endpoint connectors are to be filled in with respective parameters from respective change-request commands.

7. The computer-implemented process of claim 1, wherein the CM server communicates with the AF server using an account-based common language having commands for managing user accounts of the business sources, and wherein the access-control records include entitlement attributes of the user accounts describing account holders' right to access applications and/or data.

8. The computer-implemented process of claim 1, wherein the automated change-request fulfillment process for a change request for a target business source further includes:
at the CM server:
after sending the change-request command to the AF server,
subsequently receiving a corresponding change-request response from the AF server and updating a local record to indicate completion of the change request; and
at the AF server:
after issuing the respective native command defined for the change-request command to the respective endpoint computer to effect the requested change on the target business source,
returning the change-request response to the CM server.

9. The computer-implemented process of claim 1, wherein executing the set of checks includes identifying the endpoint computer on which the target business source resides, and determining that the identified endpoint connector supports the change-request command.

10. The computer-implemented process of claim 1, further including, at the CM server, (i) receiving a request identifier from the AF server in response to sending the change-request command to the AF server, (ii) storing the request identifier in association with the change-request command in a pending state, (iii) receiving the request identifier as part of the change-request response from the AF server, and (iv) using the request identifier from the change-request response to retrieve the stored change-request command in the pending state to complete processing of the change-request command.

11. The computer-implemented process of claim 10, wherein the change-request command is sent to the AF server with a callback address for the CM server, the callback address to be used by the AF server to issue a callback to the callback address when sending the change-request response.

12. The computer-implemented process of claim 11, wherein the change-request response includes one or more name-value pairs for respective attributes of the business source, and wherein updating the local record includes updating the attributes with the respective values of the respective name-value pairs.

13. The computer-implemented process of claim 12, wherein the change-request response includes a success/fail indicator having a first state indicating successful completion of the change-request command, the CM server using the first state to enable the updating of the attributes.

14. The computer-implemented process of claim 1, wherein the target business source employs a database containing respective access-control records, and wherein the native command of the identified endpoint connector includes a database query statement to modify a record of the database.

15. The computer-implemented process of claim 1, further including, at the AF server, (i) sending a request identifier to the CM server in response to receiving the change-request command therefrom, (ii) associating the request identifier with the change-request command during processing thereof, and (iii) including the request identifier as part of the change-request response to the CM server to identify the change-request response as being associated with the change-request command having a pending state at the CM server.

16. The computer-implemented process of claim 15, wherein the change-request command is received from the CM server with a callback address for the CM server, and wherein returning the change-request response to the CM server includes issuing a callback to the callback address.

17. The computer-implemented process of claim 16, wherein the change-request response includes one or more name-value pairs for respective attributes of the business source, the name-value pairs being used by the CM server as part of updating the local record to update the attributes with the respective values of the respective name-value pairs.

18. The computer-implemented process of claim 17, wherein the change-request response includes a success/fail indicator having a first state indicating successful completion of the change-request command, the CM server using the first state to enable the updating of the attributes.

19. The computer-implemented process of claim 1, wherein:
- the endpoint connectors are of a plurality of distinct types for respective ways of connecting to and communicating with respective distinct types of business sources on the respective endpoint computers;
- the automated change-request fulfillment process includes the CM server communicating with the AF server using an account-based common language having commands for managing user accounts, the commands being common-language commands not specific to any one of the specific types of business sources;
- in a first instance of the automated change-request fulfillment process for a first change request directed to a first target business source:
  - (i) the respective change-request command identifies a first endpoint computer,
  - (ii) the AF server selects a first endpoint connector for the first endpoint computer and enqueues the first change-request command on the first endpoint connector, and
  - (iii) the first endpoint connector when processing the enqueued first change-request command, issues a corresponding first native command defined for the first change-request command to the first endpoint computer to effect the requested change on the first target business source; and
- in a second instance of the automated change-request fulfillment process for a first change request directed to a second target business source distinct from the first target business source:
  - (i) the respective change-request command identifies a second endpoint computer distinct from the first endpoint computer,
  - (ii) the AF server selects a second endpoint connector for the second endpoint computer and enqueues the second change-request command on the second endpoint connector, the second endpoint connector being distinct from the first endpoint connector, and
  - (iii) the second endpoint connector when processing the enqueued second change-request command, issues a corresponding second native command defined for the second change-request command to the second endpoint computer to effect the requested change on the second target business source.

* * * * *